(12) United States Patent  (10) Patent No.: US 7,823,839 B2
Glezer et al.  (45) Date of Patent: Nov. 2, 2010

(54) AIRFOIL PERFORMANCE MODIFICATION USING SYNTHETIC JET ACTUATORS

(75) Inventors: Ari Glezer, Atlanta, GA (US); Michael Edward DeSalvo, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 355 days.

(21) Appl. No.: 11/263,504

(22) Filed: Oct. 31, 2005

(65) Prior Publication Data

US 2007/0095987 A1   May 3, 2007

(51) Int. Cl.
B64C 21/00 (2006.01)
(52) U.S. Cl. .................................................. 244/204.1
(58) Field of Classification Search .............. 244/199.1, 244/200.1, 201, 203, 204, 130, 204.1, 207–209
See application file for complete search history.

(56) References Cited

U.S. PATENT DOCUMENTS

| 4,046,338 A | * | 9/1977 | Kline et al. ................. 244/213 |
| 5,040,560 A | | 8/1991 | Glezer et al. .................. 137/13 |
| 5,255,881 A | * | 10/1993 | Rao ........................ 244/199.1 |
| 5,758,823 A | * | 6/1998 | Glezer et al. ..................... 239/4 |
| 5,772,155 A | * | 6/1998 | Nowak ..................... 244/200.1 |
| 5,894,990 A | | 4/1999 | Glezer et al. ................. 239/423 |
| 5,957,413 A | * | 9/1999 | Glezer et al. ................. 244/208 |
| 5,988,522 A | | 11/1999 | Glezer et al. .................. 239/11 |
| 6,056,204 A | | 5/2000 | Glezer et al. .................... 239/8 |
| 6,109,222 A | | 8/2000 | Glezer et al. ............... 123/46 R |
| 6,123,145 A | | 9/2000 | Glezer et al. ............ 165/104.33 |
| 6,247,525 B1 | | 6/2001 | Smith et al. ............. 165/104.25 |
| 6,412,732 B1 | * | 7/2002 | Amitay et al. ............... 244/208 |

(Continued)

OTHER PUBLICATIONS

U.S. Patent Application, "Apparatus and Method for Enhanced Heat Transfer," filed Sep. 1, 2005, U.S. Appl. No. 11/217,759.
U.S. Patent Application, "Apparatus and Method for Enhanced Heat Transfer," filed Aug. 17, 2005, U.S. Appl. No. 11/205,665.

*Primary Examiner*—Timothy D Collins
*Assistant Examiner*—Valentina Xavier
(74) *Attorney, Agent, or Firm*—Thomas, Kayden, Horstemeyer & Risley, LLP

(57) ABSTRACT

Systems and methods for modifying fluid flowing over solid bodies are provided. A representative system incorporates a vorticity concentration-producing component and a synthetic jet actuator. The vorticity concentration-producing component is disposed on a pressure side of the solid body. The fluid flowing over the solid body remains attached to a surface of the solid body in a vicinity of the vorticity concentration-producing component. The synthetic jet actuator includes a jet housing that incorporates an internal chamber with a volume of fluid and an opening in the jet housing connecting the internal chamber to an external environment having the fluid. The synthetic jet actuator is operative to periodically change the volume within the internal chamber such that a synthetic jet stream comprising a series of fluid vortices is generated and projected in the external environment out from the opening of the jet housing resulting in a reduction in pressure drag of the solid body compared to the pressure drag exhibited by the solid body without operation of the synthetic jet actuator.

26 Claims, 12 Drawing Sheets

U.S. PATENT DOCUMENTS

| | | | |
|---|---|---|---|
| 6,457,654 B1 | 10/2002 | Glezer et al. | 239/4 |
| 6,554,607 B1 | 4/2003 | Glezer et al. | 431/1 |
| 6,588,497 B1 | 7/2003 | Glezer et al. | 165/84 |
| 6,644,598 B2 * | 11/2003 | Glezer et al. | 244/208 |
| 6,796,533 B2 * | 9/2004 | Barrett et al. | 244/208 |
| 2002/0190165 A1 * | 12/2002 | Glezer et al. | 244/207 |

* cited by examiner (a)

(b)

AIRFOIL PERFORMANCE MODIFICATION USING SYNTHETIC JET ACTUATORS

STATEMENT REGARDING FEDERALLY SPONSORED RESEARCH

This invention was made with Government support under agreement FA9550-04-1-0028 awarded by the United States Air Force. The Government has certain rights in the invention.

FIELD OF THE INVENTION

The present invention generally relates to fluid actuators for manipulation and control of fluid flow.

DESCRIPTION OF THE RELATED ART

The ability to manipulate and control the evolution of shear flows has tremendous potential for influencing system performance in diverse technological applications, including: lift and drag of aerodynamic surfaces, and thrust management. That these flows are dominated by the dynamics of a hierarchy of vortical structures, evolving as a result of inherent hydrodynamic instabilities (e.g., Ho & Huerre, 1984), suggests control strategies based on manipulation of these instabilities by the introduction of small disturbances at the flow boundary. A given shear flow is typically extremely receptive to disturbances within a limited frequency band and, as a result, these disturbances are rapidly amplified and can lead to substantial modification of the base flow and the performance of the system in which it is employed.

There is no question, that suitable actuators having fast dynamic response and relatively low power consumption are the foundation of any scheme for the manipulation and control of shear flows. Most frequently, actuators have had mechanically moving parts, which come in direct contact with the flow [e.g., vibrating ribbons (Schubauer & Skramstad J. Aero Sci. 14 1947), movable flaps (Oster & Wygnanski, 1982), or electromagnetic elements (Betzig AIAA, 1981)]. This class of direct-contact actuators also includes piezoelectric actuators, the effectiveness of which has been demonstrated in flat plate boundary layers (Wehrmann 1967, and Jacobson & Reynolds Stan. U. TF-64 1995), wakes (Wehrmann Phys. Fl. 8 1965, 1967, and Berger Phys. Fl. S191 1967), and jets (Wiltse & Glezer 1993). Actuation can also be effected indirectly (and, in principle, remotely) either through pressure fluctuations [e.g., acoustic excitation (Crow & Champagne JFM 48 1971)] or body forces [e.g., heating (Liepmann et al. 1982, Corke & Mangano JFM 209 1989, Nygaard and Glezer 1991), or electromagnetically (Brown and Nosenchuck, AIAA 1995)].

Flow control strategies that are accomplished without direct contact between the actuator and the embedding flow are extremely attractive because the actuators can be conformally and nonintrusively mounted on or below the flow boundary (and thus can be better protected than conventional mechanical actuators). However, unless these actuators can be placed near points of receptivity within the flow, their effectiveness degrades substantially with decreasing power input. This shortcoming can be overcome by using fluidic actuators where control is effected intrusively using flow injection (jets) or suction at the boundary. Although these actuators are inherently intrusive, they share most of the attributes of indirect actuators in that they can be placed within the flow boundary and require only an orifice to communicate with the external flow. Fluidic actuators that perform a variety of "analog" (e.g., proportional fluidic amplifier) and "digital" (e.g., flip-flop) throttling and control functions without moving mechanical parts by using control jets to affect a primary jet within an enclosed cavity have been studied since the late 1950's (Joyce, HDL-SR 1983). Some of these concepts have also been used in open flow systems. Viets (AIAA J. 13 1975) induced spontaneous oscillations in a free rectangular jet by exploiting the concept of a flip-flop actuator and more recently, Raman and Cornelius (AIAA J. 33 1995) used two such jets to impose time harmonic oscillations in a larger jet by direct impingement.

More recently, a number of workers have recognized the potential for MEMS (micro electro mechanical systems) actuators in flow control applications for large scale systems and have exploited these devices in a variety of configurations. One of a number of examples of work in this area is that of Ho and his co-investigators (e.g., Liu, Tsao, Tai, and Ho, 1994) who have used MEMS versions of 'flaps' to effect flow control. These investigators have opted to modify the distribution of streamwise vorticity on a delta wing and thus the aerodynamic rolling moment about the longitudinal axis of the aircraft.

Background Technology for Synthetic Jets

It was discovered at least as early as 1950 that if one uses a chamber bounded on one end by an acoustic wave generating device and bounded on the other end by a rigid wall with a small orifice, that when acoustic waves are emitted at high enough frequency and amplitude from the generator, a jet of air that emanates from the orifice outward from the chamber can be produced. See, for example, Ingard and Labate, Acoustic Circulation Effects and the Nonlinear Impedance of Orifices, The Journal of the Acoustical Society of America, March, 1950. The jet is comprised of a train of vortical air puffs that are formed at the orifice at the generator's frequency.

The concern of scientists at that time was only with the relationship between the acoustic impedance of the orifice and the "circulation" (i.e., the vortical puffs, or vortex rings) created at the orifice. There was no suggestion to combine or operate the apparatus with another fluid stream in order to modify the flow of that stream (e.g., its direction). Furthermore, there was no suggestion that following the ejection of each vortical puff, a momentary air stream of "make up" air of equal mass is drawn back into the chamber and that, as a result, the jet is effectively synthesized from the air outside of the chamber and the net mass flux out of the chamber is zero. There was also no suggestion that such an apparatus could be used in such a way as to create a fluid flow within a bounded (or sealed) volume.

Such uses and combinations were not only not suggested at that time, but also have not been suggested by any of the ensuing work in the art. So, even though a crude synthetic jet was known to exist, applications to common problems associated with other fluid flows or with lack of fluid flow in bounded volumes were not even imagined, much less suggested. Evidence of this is the persistence of certain problems in various fields which have yet to be solved effectively.

Additional information pertaining to synthetic jets, for example, Smith, B. L. and Glezer, A., *The Formation and Evolution of Synthetic Jets*, Physics of Fluids Vol. 10, no. 9, September 1998, also is available.

Vectoring of a Fluid Flow

Until recently, the direction of a fluid jet has chiefly been controlled by mechanical apparatus which protrude into a jet flow and deflect it in a desired direction. For example, aircraft engines often use mechanical protrusions disposed in jet exhaust in order to vector the fluid flow out of the exhaust nozzle. These mechanical protrusions used to vector flow usually require complex and powerful actuators to move them. Such machinery often exceeds space constraints and often has a prohibitively high weight. Furthermore, in cases like that of jet exhaust, the mechanism protruding into the flow must withstand very high temperatures. In addition, large power inputs are generally required in order to intrude into the flow and change its direction. For all these reasons, it would be more desirable to vector the flow with little or no direct intrusion into the flow. As a result, several less intrusive means have been developed.

Jet vectoring can be achieved without active actuation using coanda effect, or the attachment of a jet to a curved (solid) surface which is an extension one of the nozzle walls (Newman, B. G. *The Deflexion of Plane Jets by Adjacent Boundaries-Coanda Effect*, Boundary Layer and Flow Control v. 1, 1961 edited by Lachmann, G. V. pp. 232-265.). However, for a given jet momentum, the effect is apparently limited by the characteristic radius of the curved surface. The effectiveness of a coanda surface can be enhanced using a counter current flow between an external coanda surface and a primary jet. Such a system has been used to effect thrust vectoring in low-speed and high-speed jets by Strykowski et al. (Strykowski, P. J, Krothapalli, A., and Forliti D. J. *Counterflow Thrust Vectoring of Supersonic Jets*, AIAA Paper No. 96-0115, AIAA 34th Aerospace Sciences Meeting, Reno, Nev., 1996.).

The performance of coanda-like surfaces for deflection of jets can be further improved by exploiting inherent instabilities at the edges of the jet flow when it is separated from the surface. It has been known for a number of years that substantial modification of shear flows can result from the introduction of small perturbations at the boundaries of the shear flow. This modification occurs because the shear flow is typically hydrodynamically unstable to these perturbations. Such instability is what leads to the perturbations' rapid amplification and resultant relatively large effect on the flow. This approach has been used in attempts to control separating flows near solid surfaces. the flow typically separates in the form of a free shear layer and it has been shown that the application of relatively small disturbances near the point of separation can lead to enhanced entrainment of ambient fluid into the layer. Because a solid surface substantially restricts entrainment of ambient fluid, the separated flow moves closer to the surface and ultimately can reattach to the surface. This effect has been used as a means of vectoring jets near solid surfaces. See e.g., Koch (Koch, C. R. *Closed Loop Control of a Round Jet/Diffuser in Transitory Stall*, PhD. Thesis, Stanford University, 1990) (using wall jets along in a circular diffuser to effect partial attachment and thus vectoring of a primary round jet).

Similar to mechanical deflectors, technologies that rely on coanda surfaces are limited because of the size and weight of the additional hardware. Clearly, a coanda collar in aerospace applications must be carried along at all times whether or not it is being used.

Fluidic technology based on jet-jet interaction has also been used for flow vectoring or producing oscillations of free jets. Fluidic actuators employing control jets to affect a primary jet of the same fluid within an enclosure that allows for inflow and outflow have been studied since the late 1950's. These actuators perform a variety of "analog" (e.g., proportional fluidic amplifier) and "digital" (e.g., flip-flop) throttling and control functions in flow systems without moving mechanical parts (Joyce, 1983). In the "analog" actuator, the volume flow rate fraction of two opposite control jets leads to a proportional change in the volume flow rate of the primary stream out of two corresponding output ports. The "digital" actuator is a bistable flow device in which the control jets and Coanda effect are used to direct the primary stream into one of two output ports.

These approaches have also been employed in free jets. Viets (1975) induced spontaneous oscillations in a free rectangular jet by exploiting the concept of a "flip-flop" actuator. More recently, Raman and Cornelius (1995) used two such jets to impose time harmonic oscillations in a larger jet by direct impingement. The control jets were placed on opposite sides of the primary jet and could be operated in phase or out of phase with each other.

Use of a fluidic jet to vector another flow, while known for years, has been used with limited success. In particular, the only way known to vector a jet with another jet (dubbed a "control jet") of the same fluid was to align the control jet so that it impinges directly on the primary jet. Obviously, this involved injection of mass into the flow and has not been deemed very effective at vectoring the primary flow because it relies on direct momentum transfer between the jets for altering the direction of the primary jet. Direct momentum transfer is not economical in general and undesirable when the available power is limited (such as on board an aircraft). Furthermore, such control hardware is difficult and expensive to install because of the complex plumbing necessary to supply the control jet with fluid to operate.

Modification of Fluid Flows about Aerodynamic Surfaces

The capability to alter the aerodynamic performance of a given airframe by altering its shape (e.g., the "camber" of an airfoil) during various phases of the flight can lead to significant extension of the airframe's operating envelope. Geometric modification of lifting surfaces has so far been accomplished by using mechanical flaps and slats. However, because of the complex control system required, such devices are expensive to manufacture, install and maintain. Furthermore, flap systems not only increase the weight of the airframe, but also require considerable interior storage space that could be used for cargo, and additional ancillary hardware (e.g., hydraulic pumps, piping, etc.). In some applications, the weight penalty imposed by the flaps may more than offset their usefulness.

Much of the recent work on flow control techniques with the objective of extending the post stall flight envelope of various airfoil configurations has focused on the manipulation of flow separation at moderate and large angles of attack either at the leading edge or over flaps (e.g., Seifert et al., *Oscillatory Blowing: A Tool to Delay Boundary-Layer Separation*, AIAA, 1993). This has been typically accomplished by exploiting the instability of the separating shear layer and its receptivity to time-periodic actuation (e.g., pulsed blowing) on the time scale of the flow about the airfoil, which results in a Coanda-like unsteady reattachment. Active control techniques that have achieved varying degrees of separation control by manipulation of the unstable separated free shear layer have included external and internal acoustic excitation (e.g., Ahuja and Burrin, *Control of Flow Separation by Sound*, AIAA, 1984, and Hsiao et al., *Control of Wall-Separated Flow by Internal Acoustic Excitation*, AIAA, 1990), vibrating ribbons or flaps (e.g., Neuburger and Wygnanski, *The Use of a Vibrating Ribbon to Delay Separation on Two Dimensional Airfoils*, TR-88-0004, 1987), and steady and unsteady blowing or bleed (e.g., Williams et al., *The Mechanism of Flow Control on a Cylinder with the Unsteady Bleed Technique*, AIAA, January, 1991, and Chang et al., *Forcing Level Effects of Internal Acoustic Excitation on the Improvement of Airfoil Performance*, Journal of Aircraft, 1992). In these experiments, the time-periodic actuation was typically applied at a dimensionless (reduced) frequency such that the actuation period scaled with the time of flight over the length of the reattached flow.

More recently, Smith et al. (*Modification of Lifting Body Aerodynamics using Synthetic Jet Actuators*, AIAA, January, 1998) and Amitay et al. (*Flow Reattachment Dynamics over a Thick Airfoil Controlled by Synthetic Jet Actuators*, AIAA, January, 1999 and *Modification of the Aerodynamics Characteristics of an Unconventional Airfoil Using Synthetic Jet Actuators*, AIAA Journal, June, 2001) demonstrated the suppression of separation over an unconventional airfoil at moderate Reynolds numbers (up to $10^6$) that resulted in a dramatic increase in lift and a corresponding decrease in pressure drag. Actuation was effected using synthetic (zero mass flux) jet actuators, which were deliberately operated at frequencies that were typically an order of magnitude higher than the characteristic (shedding) frequency of the airfoil. These authors argued that the interaction of high-frequency zero net mass flux jets with the cross flow leads to local modification of the apparent aerodynamic shape of the flow surface, and, as a result, to full or partial suppression of flow separation. Moreover, the recent experiments of Erk (*Separation Control on a Post-Stall Airfoil Using Acoustically Generated Perturbations*, Ph.D. Dissertation, 1997) demonstrated the suppression of separation on an FX61-184 airfoil at Reynolds numbers up to $3 \times 10^6$ using synthetic jet actuation at frequencies up to $F^+ \approx O(100)$.

The interaction between a cross flow over a 2-D circular cylinder and surface-mounted synthetic jet actuators was recently investigated in detail by Honohan et al. (*Aerodynamic Control Using Synthetic Jets*, AIAA, June, 2000). These authors showed that when the jets are operated on a time scale that is well below the characteristic time scale of the base flow, their interaction with the cross flow leads to the formation of distinct quasi-steady flow regions near the surface and displacement of the local streamlines induces an apparent or virtual change in the shape of the surface and in the local pressure gradient. The acceleration of the cross flow around the interaction domain is accompanied by substantial alterations of the streamwise pressure gradient both locally and globally. As a result the surface boundary layer downstream of the interaction domain becomes thinner allowing the flow to overcome stronger adverse pressure gradients and therefore delaying (or altogether suppressing) flow separation.

The concept of modifying the apparent aerodynamic shape of aero-surfaces in order to prescribe the streamwise pressure distribution and therefore to influence its aerodynamic performance is not new and was addressed in U.S. Pat. No. 5,758,823, to Glezer, et al., entitled Synthetic Jet Actuators and Applications Thereof. This patent disclosed the use of synthetic jet actuators for the modification of fluid flow, generally. Additionally, U.S. Pat. No. 5,758,853 also discussed the use of synthetic jet actuators embedded into solid surfaces in order to alter the apparent aerodynamic shape of these surfaces.

Recent studies have suggested that the use of synthetic jet actuators in aerodynamic surfaces at relatively low levels of actuation [i.e., momentum coefficient ($C\mu$) of $O(10^{-3})$, where $C\mu$ is the momentum ratio between the jet and the free stream] and high enough operating frequencies is very effective at post stall angles of attack of the baseline airfoil, because the actuation leads to alteration of the streamwise pressure gradient and therefore to the suppression of separation. However, at low angles of attack in the absence of stall, the induced aerodynamic changes require higher actuation levels (or higher $C\mu$) and therefore an increase in energy usage, and possibly size of the synthetic jet actuator. While this energy cost may be acceptable for short periods of time (e.g., during maneuvering), it would be desirable to have a method and device for altering the aerodynamic characteristics with synthetic jet actuators at low actuation levels for prolonged actuation periods such as flight in cruise conditions.

SUMMARY

Briefly described, the present invention involves the use of synthetic jet actuators positioned downstream of vorticity concentration-producing components, e.g., protrusions and/or depressions, for modification of fluid flow about various aerodynamic surfaces. Particularly, the present invention is concerned with modifying performance of solid bodies at low angles of attack wherein the baseline flow is fully attached.

In this regard, the present invention involves the modification of fluid flow about a body by altering the apparent aerodynamic shape of the body when the body is immersed in a fluid flow field. A brief description of an embodiment of the invention follows:

For such an application, a synthetic jet actuator is positioned downstream from a vorticity concentration-producing component, with the jet orifice directing a synthetic jet stream substantially in a downstream direction. The interaction of the fluid flow about the body with the synthetic jet stream changes the overall fluid flow field around the solid body resulting in a reduction in pressure drag of the solid body compared to the pressure drag exhibited by the solid body without operation of the synthetic jet actuator.

Embodiments can use one or more synthetic jet actuators to modify the aerodynamic shape of a lifting surface in a flow field. Such a lifting surface typically comprises a wing, the fuselage, a rotor blade, etc.

Another embodiment of a system for modifying a fluid flowing over a solid body, comprises: a vorticity concentration-producing component disposed on a pressure side of the solid body, wherein the fluid flowing over the solid body separates from a surface of the solid body due to the vorticity concentration-producing component; and a synthetic jet actuator positioned such that the fluid flowing over the solid body encounters the vorticity concentration-producing component before encountering a fluid stream produced by the synthetic jet actuator, the synthetic jet actuator having a jet housing, the jet housing having an internal chamber with a volume of fluid and an opening in the jet housing connecting the internal chamber to an external environment having the fluid, the synthetic jet actuator being operative to periodically change the volume within the internal chamber such that a synthetic jet stream comprising a series of fluid vortices is generated and projected in the external environment out from the opening of the jet housing resulting in a reduction in pressure drag of the solid body compared to the pressure drag exhibited by the solid body without operation of the synthetic jet actuator.

Still another embodiment of such a system comprises: a first vorticity concentration-producing component disposed on a pressure side of the solid body; a first synthetic jet actuator positioned on the pressure side of the solid body; a second vorticity concentration-producing component disposed on the pressure side of the solid body, the second vorticity concentration-producing component being positioned downstream of the first synthetic jet actuator; and a second synthetic jet actuator positioned on the pressure side of the solid body; the first and second synthetic jet actuators being operative to emanate respective synthetic jet streams in directions corresponding generally to a direction of the fluid flowing over the solid body such that pressure drag of the solid body is reduced compared to the pressure drag exhibited by the solid body without operation of the synthetic jet actuators.

An embodiment of a method for modifying a fluid stream flowing over a solid body, comprising the steps of: providing the fluid stream flowing over the solid body; disposing a first vorticity concentration-producing component on a pressure side of the solid body; and emanating a first synthetic jet stream to manipulate a vorticity concentration produced by the vorticity concentration-producing component such that pressure drag of the solid body is reduced compared to the pressure drag exhibited by the solid body without the synthetic jet stream.

Other features and/or advantages will be or may become apparent to one with skill in the art upon examination of the following drawings and detailed description. All such additional features and/or advantages are intended to be included herein within the scope of the present invention, as is defined by the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, like reference numerals designate corresponding parts throughout the several views.

DETAILED DESCRIPTION

Figure 1A:
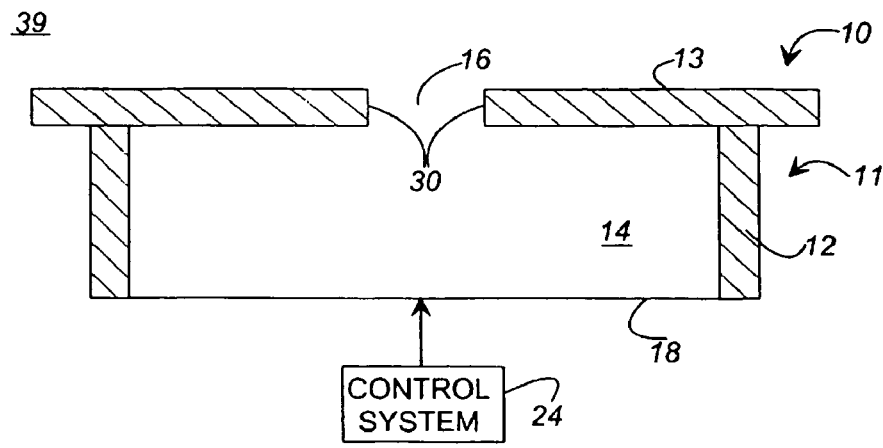
FIG. 1A is a schematic cross-sectional side view of an embodiment of a zero net mass flux synthetic jet actuator with a control system.

As will be described in detail here, the present invention involves the use of synthetic jet actuators positioned to modify fluid flow about various aerodynamic surfaces. Particularly, the present invention is concerned with modifying performance of solid bodies at relatively low angles of attack wherein the baseline flow is fully attached. However, the present invention also may have application to solid bodies, e.g. lifting surfaces, at higher angles of attack. The present disclosure is not intended to limit implementations to only low angle of attack applications. In this regard, various exemplary embodiments of systems and methods for modifying fluid flowing over solid bodies will be described.

As mentioned previously, strategies for active flow control on lifting surfaces have primarily focused on mitigation of partial or complete flow separation where the separating shear layer is dominated by a strong coupling to the instability of the wake which leads to the formation and shedding of large-scale vortical structures at the characteristic (most unstable) wake frequency. Therefore, attempts to manipulate and ultimately control separation over stalled airfoils and flaps have relied on the narrow-band receptivity of the separating, wake-dominated flow to external, time-periodic actuation at the shedding frequency for which the Strouhal number $St_{iCl}$ is O(1). The actuation leads to a Coanda-like deflection of the shed vortices towards the surface of the stalled airfoil and consequently to lift enhancement. A different approach to flow control that emphasizes fluidic modification of the "apparent" aerodynamic shape of the surface by exploiting the interaction between arrays of surface-mounted actuators and the local cross flow was developed at Georgia Tech. Vorticity is generated by fluidic injection (usually without net injection of mass) across the flow boundary, and by the imposed local changes in the streamwise pressure gradient. It is noted that the use of trapped vorticity to alter the apparent local surface curvature and the direction of the flow over lifting surfaces is not necessarily in and of itself new. The work at Georgia Tech has demonstrated that the formation of interaction domains by synthetic jet actuators upstream of flow separation can result in complete or partial bypass (or suppression) of separation. Control is attained at actuation frequencies that are at least an order of magnitude higher than the characteristic flow frequency and therefore is decoupled from the global flow (wake) instabilities.

Because this approach to flow control is decoupled from the global instability of the base flow, it can be effective not only when the baseline flow is separated but also when it is fully attached, namely at cruise conditions at low angles of attack. It has also been shown that the formation of a stationary trapped vortex above an airfoil at low angles of attack leads to a reduction in pressure drag that is comparable to the magnitude of the pressure drag of the baseline configuration with minimal lift penalty. In experiments with the disclosed embodiments, actuation was accomplished using a hybrid actuator comprised of a synthetic jet downstream from a miniature surface-mounted passive obstruction of scale O(0.01 c) and the extent and strength of the trapped vortex was varied by varying the actuation frequency.

This approach was also applied to manipulate the Kutta condition of an airfoil using controlled concentrations of trapped vorticity near its trailing edge that are induced by a miniature, O(0.01 c) hybrid actuator similar to a Gurney flap. In the absence of actuation, the hybrid actuator leads to an increase in lift but an overall decrease in $L/D_p$ compared to the baseline (smooth) airfoil. When actuation is applied, there is a substantial reduction in drag and therefore an increase in $L/D_p$ compared to both the baseline airfoil and the airfoil with inactive actuator over a broad range of angles of attack. The effectiveness of the actuation and therefore the aerodynamic performance of the airfoil can be continuously and monotonically varied by adjusting the momentum coefficient $C_\mu$ of the control jet from a configuration of an airfoil with a conventional Gurney flap through an airfoil that has similar performance as that of the smooth (baseline) airfoil to an airfoil that has higher lift to pressure drag ratio. The overall variation in relative to the baseline is ±20%.

In the present embodiments, the aerodynamic performance of a swept wing model based on a commercial aircraft configuration is controlled at low (cruise) angles of attack by substantially reducing the pressure drag with virtually no penalty in lift or friction drag. This is accomplished by placing a hybrid actuator on the pressure side of the airfoil downstream of the leading edge to manipulate trapped vorticity concentrations that are induced near the surface of the airfoil.

A. Construction of the Synthetic Jet Actuator

FIG. 1A depicts an embodiment of a synthetic jet actuator 10 comprising a housing 11 defining and enclosing an internal chamber 14. The housing 11 and chamber 14 can take virtually any geometric configuration, but for purposes of discussion and understanding, the housing 11 is shown in cross-section in FIG. 1A to have a rigid side wall 12, a rigid front wall 13, and a rear diaphragm 18 that is flexible to an extent to permit movement of the diaphragm 18 inwardly and outwardly relative to the chamber 14. The front wall 13 has an orifice 16 of any geometric shape. The orifice diametrically opposes the rear diaphragm 18 and connects the internal chamber 14 to an external environment having ambient fluid 39.

The flexible diaphragm 18 may be controlled to move by any suitable control system 24. For example, the diaphragm 18 may be equipped with a metal layer, and a metal electrode may be disposed adjacent to but spaced from the metal layer so that the diaphragm 18 can be moved via an electrical bias imposed between the electrode and the metal layer. Moreover, the generation of the electrical bias can be controlled by any suitable device, for example but not limited to, a computer, logic processor, or signal generator. The control system 24 can cause the diaphragm 18 to move periodically, or modulate in time-harmonic motion, and force fluid in and out of the orifice 16.

A more particular device for producing the time harmonic motion of the diaphragm 18 is a piezoelectric actuator. A common piezoelectric actuator may be attached by adhesive, or other means, to the flexible diaphragm 18. When the piezoelectric device is caused to vibrate by an electrical current, the diaphragm 18 will also vibrate at a corresponding frequency in time harmonic motion. A computer, or even a wave generator, would be an appropriate control and/or actuation device for a piezoelectric actuator.

Figure 1B:
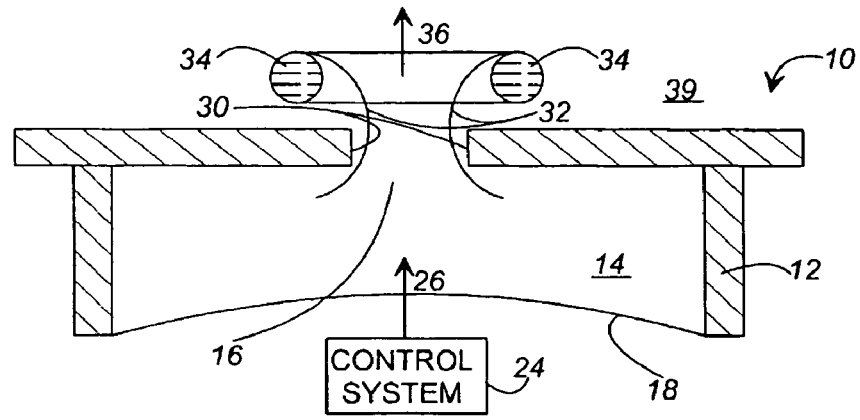
FIG. 1B is a schematic cross-sectional side view of the synthetic jet actuator of FIG. 1A, depicting the jet as the control system causes the diaphragm to travel inward, toward the orifice.

The operation of the synthetic jet actuator 10 will now be described with reference to FIGS. 1B and 1C. FIG. 1B depicts the synthetic jet actuator 10 as the diaphragm 18 is controlled to move inward into the chamber 14, as depicted by arrow 26. The chamber 14 has its volume decreased and fluid is ejected through the orifice 16. As the fluid exits the chamber 14 through the orifice 16, the flow separates at sharp orifice edges 30 and creates vortex sheets 32 which roll into vortices 34 and begin to move away from the orifice edges 30 in the direction indicated by arrow 36.

Figure 1C:
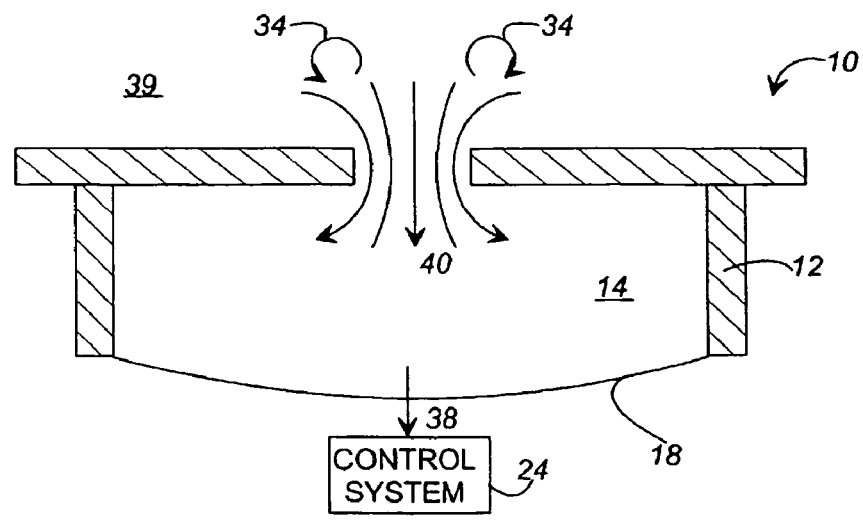
FIG. 1C is a schematic cross-sectional side view of the synthetic jet actuator of FIG. 1A, depicting the jet as the control system causes the diaphragm to travel outward, away from the orifice.

FIG. 1C depicts the synthetic jet actuator 10 as the diaphragm 18 is controlled to move outward with respect to the chamber 14, as depicted by arrow 38. The chamber 14 has its volume increased and ambient fluid 39 rushes into the chamber 14 as depicted by the set of arrows 40. The diaphragm 18 is controlled by the control system 24 so that when the diaphragm 18 moves away from the chamber 14, the vortices 34 are already removed from the orifice edges 30 and thus are not affected by the ambient fluid 39 being drawn into the chamber 14. Meanwhile, a jet of ambient fluid 39 is synthesized by the vortices 34 creating strong entrainment of ambient fluid drawn from large distances away from the orifice 16.

B. Representative Embodiment

Figure 2A:
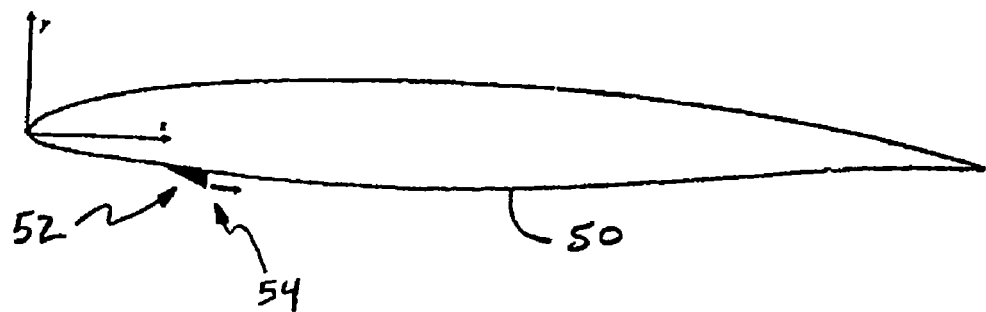
FIG. 2A is a schematic side view of a representative airfoil model, with the synthetic jet actuator denoted by an arrow.

One possible application of the present representative embodiment uses an airfoil model with a fixed cross section that is based on a commercial aircraft configuration (FIG. 2A) with a sweep angle of 27.1°. Of course, the specific airfoil section is not required in the representative embodiment and is only being used as an example. For example, the cross-section of the airfoil may be either more highly cambered or less cambered. In addition, the sweep of the airfoil may be more or less than the 27.1 degrees selected for the present representative embodiment. For the airfoil used in the representative embodiment, the chord length ("c") in the streamwise direction is 501 mm. In an experimental setup, which will be discussed later, the airfoil is designed to span the entire width of a 1×1 m wind tunnel test section. The midspan section of the pressure (bottom) surface 50 of the airfoil as used in an experimental setup has a removable rhombus-shaped panel (measuring one third of the span) that can be instrumented with various configurations of flow control hardware (the baseline measurements are obtained with a smooth panel).

In the present representative embodiment, a flow control hybrid actuator 52 integrated with a rectangular synthetic jet actuator 54 is surface-mounted on the pressure surface 50 of the airfoil such that the exit plane of the jet is approximately parallel to the sweepline. Although the present embodiment of the actuator 52 is movable, the preferred location of the actuator is such that the synthetic jet is positioned at approximately 21% chord. More specifically, the actuator is preferably positioned such that the jet orifice is at $x/c=0.21$ downstream of the leading edge (as shown schematically in FIG. 2A). The height of the representative embodiment hybrid actuator 52 above the airfoil surface is 0.017 c (or 1.7% of chord), and the jet is oriented in the nominal direction of the free stream fluid flow. The height of the actuator, of course, is not limited to this specific height. In certain embodiments, it may be desirable to have a larger or smaller actuator. For example, depending on the particular flight conditions and camber of the airfoil, the height of the hybrid actuator may be larger.

The jet orifice of the representative embodiment measures 150 mm×0.4 mm along the sweepline and cross stream directions, respectively. The jet is generated by several piezoelectric membranes that are built into a central cavity within the actuator and operate at or near resonance. Generally, the synthetic jet actuator works as described above with regard to FIGS. 1A-1C. The embodiment of the flow control hybrid actuator 52 integrated with the rectangular synthetic jet actuator 54 is depicted in greater detail in the schematic side view of FIG. 2B.

Figure 2B:
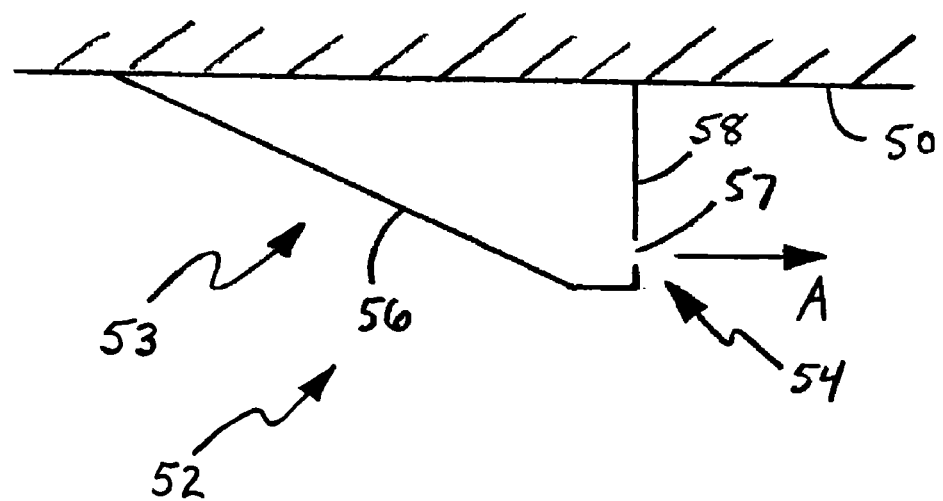
FIG. 2B is a schematic side view of the embodiment of the synthetic jet of FIG. 2A.

As shown in FIG. 2B, the flow control hybrid actuator 52 also includes a vorticity concentration-producing component 53, which, in this case, is configured as a generally ramp-shaped structure. The shape of a vorticity concentration-producing component and the angle of the synthetic jet are designed to control the size of a trapped vorticity concentration and to increase the effect of the actuation, i.e., increase lift and decrease drag. The vorticity concentration-producing component and the jet act to regulate the flux of the vorticity. Essentially, a vorticity is trapped and flux is allowed into the wake so that the size of the trapped vorticity domain is predetermined. Notably, incorporation of such a vorticity concentration-producing component appears to allow use of a synthetic jet that is less powerful than would otherwise need to be used if the vorticity concentration-producing component was not provided.

The actuator 52 incorporates a forward-facing surface 56, which is inclined with respect to the pressure surface 50 of the airfoil, and an aft-facing surface 58, which is generally perpendicular to the pressure surface 50 of the airfoil. The synthetic jet is positioned such that the fluid ejected from the jet emanates from an opening 57 in the aft-facing surface 58 as depicted by arrow A.

This is not the only embodiment of a hybrid actuator. Hybrid actuators of various configurations and orientations can be used. For instance, the synthetic jets of such actuators can be positioned in, on, upstream of or downstream of an associated vorticity concentration-producing component.

As another example, ramp-shaped actuators do not need to be oriented with the inclined surface facing forward. As still another example, the actuator does not necessarily have to be a ramp-shaped protrusion. The actuator could simply be a protrusion having a rectangular cross-section, for example. The hybrid actuator does not even have to be a fixed shape. For instance, another embodiment of the hybrid actuator may comprise an inflatable member, a mechanically-raised flap, or a shape-memory alloy device. As such, the actuator may be rendered aerodynamically unobtrusive when not in use, such as by being retracted. Under desired flight conditions, the actuator could be extended or otherwise oriented for use.

Additionally or alternatively, some embodiments of a hybrid actuator may incorporate a depression. By way of example, a depression may be located in or on the pressure surface of interest and a synthetic jet actuator could be located in or in the vicinity of the depression.

In addition, the synthetic jet does not necessarily have to be configured to emit a synthetic jet stream in a streamwise direction. For example, the synthetic jet stream could emit perpendicular to the local flow, or at some other angle. Moreover, synthetic jet stream does not need to be emitted downstream of the actuator.

In the experiments discussed in more detail below, the actuation frequency $f_{act}=1770$ Hz and the actuation Strouhal number St=fc/U varies from St=44 at a Reynolds number based on the chord length of $Re_c=6.7\times10^5$ to St=22 at $Re_c=1.3\times10^6$. The airfoil is also instrumented with a circumferential array of 70 pressure ports (located at mid-span) that are each connected to an external high-speed pressure measurement system.

In the present experiments, the skin friction on the surface of the airfoil is estimated from measurements of the velocity distributions within the boundary layer in the cross-stream plane z=0 on the suction and pressure surfaces. These velocity distributions are measured using high-magnification (between 13 and 18 μm/pixel) particle image velocimetry (PIV). The flow is seeded with micron-size smoke particles and is illuminated using a double-pulse ND-YAG laser. Image pairs are captured using a 1000×1016 pixel CCD camera. A given PIV map is averaged over 400 realizations (image pairs).

C. Control of Aerodynamic Performance

As discussed, use of the present embodiment of a hybrid actuator on the pressure side of the airfoil continuously manipulates vorticity concentrations near the surface of the airfoil. As a result, the aerodynamic performance of the airfoil is altered by reducing the pressure drag. The experimental results discussed below and presented in many of the accompanying figures compare the changes in aerodynamic performance between the smooth (baseline) airfoil, and the airfoil with the integrated hybrid actuator in the absence and presence of synthetic jet actuation. It is noted that leveraging the presence of the miniature passive obstruction of the analyzed embodiment, particularly at (though not limited to) low angles of attack, drastically reduces the required actuation power compared to the use of the jet alone.

Figure 3:
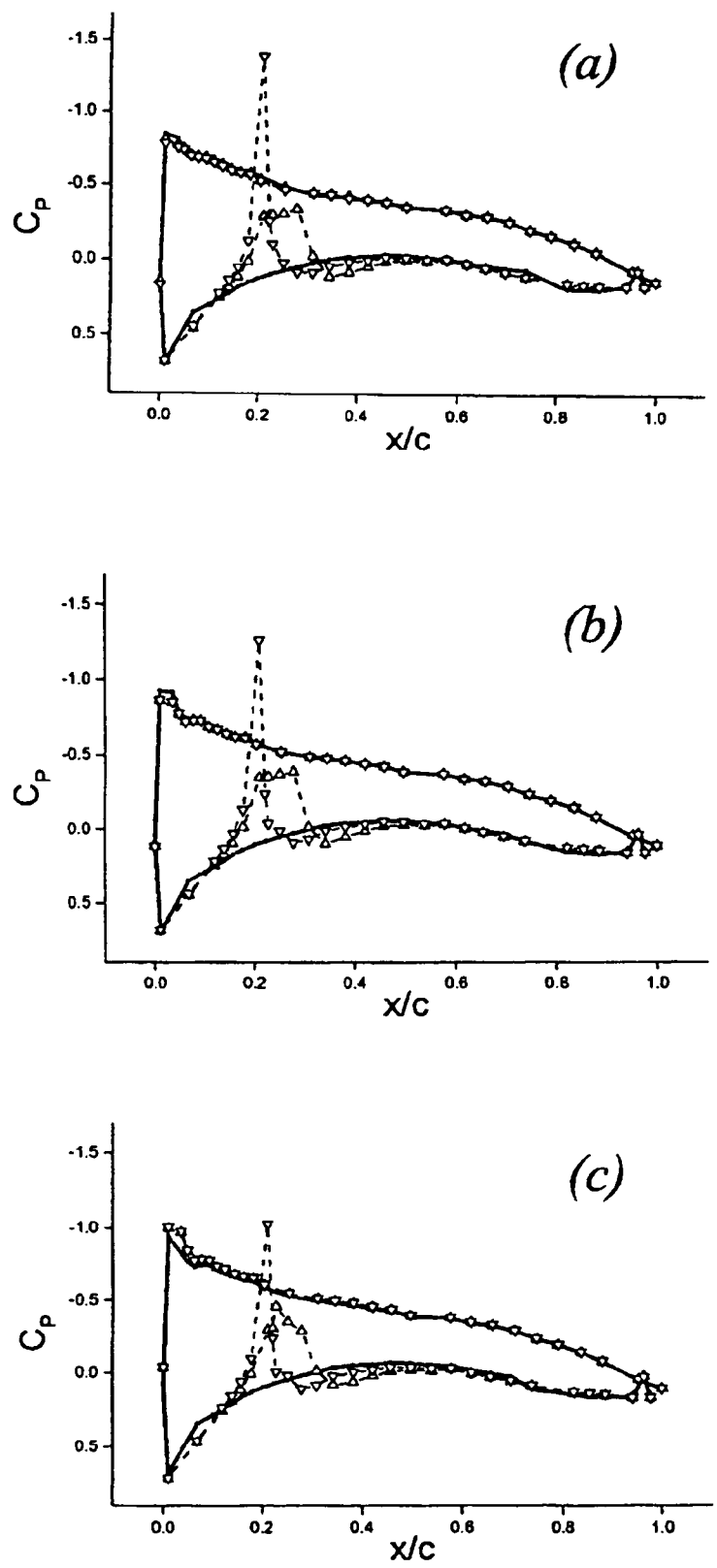
FIG. 3 includes graphs depicting pressure distributions around an airfoil for $\alpha=4°$ for (a) $Re_c=6.7\times10^5$, (b) $Re_c=1.0\times10^6$, (c) $Re_c=1.3\times10^6$, wherein (—) denotes baseline, ($\Delta$) denotes actuator not operating, and ($\nabla$) denotes actuator operating.
Figure 5:
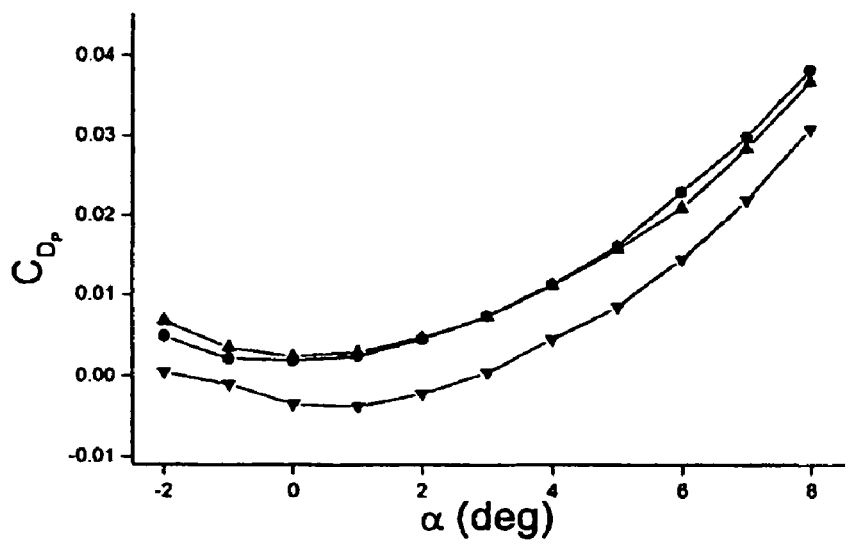
FIG. 5 is a graph depicting variation of $C_{Dp}$ with angle of attack, wherein (●) denotes baseline, (▲) denotes actuator not operating, and (▼) denotes actuator operating.
Figure 6:
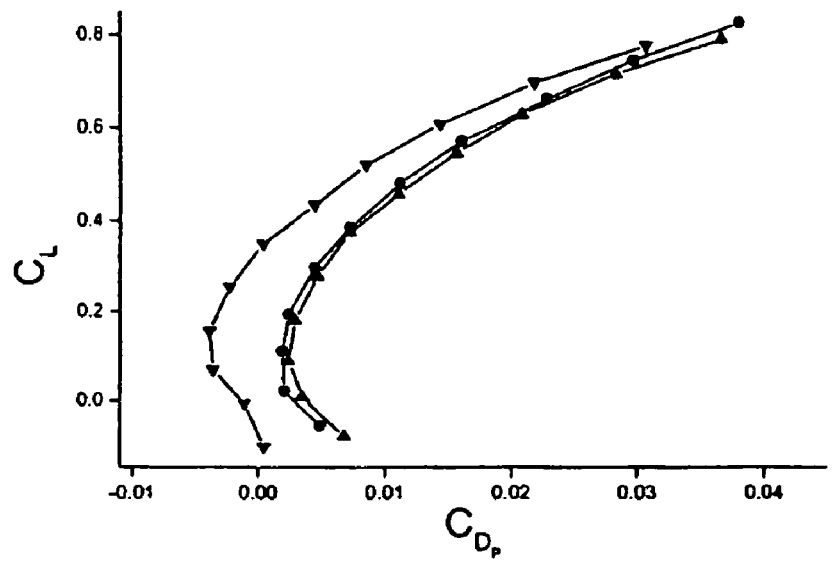
FIG. 6 is a graph depicting pressure drag polar, wherein (●) denotes baseline, (▲) denotes actuator not operating, and (▼) denotes actuator operating.

The effect of jet actuation on the pressure distribution around the airfoil when the hybrid actuator is placed at $x/c=0.21$ is shown in FIGS. 3a-c for $\alpha=4°$ and $Re_c=6.7\times10^5$, $1.0\times10^6$, and $1.3\times10^6$ respectively. Note that due to the sweep of the airfoil, the flow does not stagnate at the leading edge and therefore the maximum pressure coefficient near the leading edge is on the order of 0.8. As shown in FIGS. 3a-c, the local trapped vortex that is formed downstream of the inactive hybrid actuator induces substantial suction and therefore a decrement in $C_p$ within the domain 0.12<x/c<0.33. The maximum magnitude of this decrement increases somewhat with $Re_c$ from (nominally) 0.35 to 0.55. While this reduction in pressure can contribute to a decrease in lift, it is offset by a concomitant, smaller increase in $C_p$ over a larger segment of the pressure surface of the airfoil upstream and downstream of the actuator so that (as shown in FIGS. 5 and 6) the net impact on the lift and drag is minimal. It is interesting to note that for $Re_c=1.34\times10^6$, the presence of the hybrid actuator leads to an additional reduction in the pressure on the top surface of the airfoil through x/c=0.5.

Figure 7:
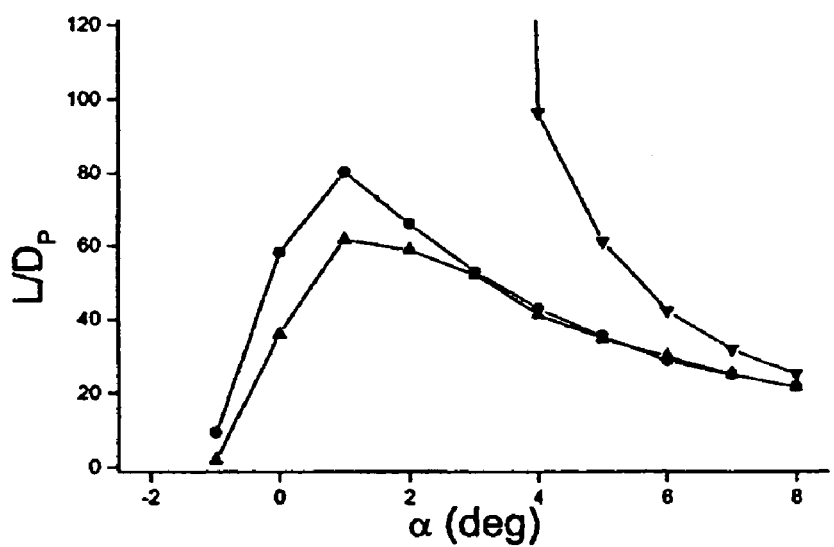
FIG. 7 is a graph depicting variation of $L/D_p$ with angle of attack, wherein (●) denotes baseline, (▲) denotes actuator not operating, and (▼) denotes actuator operating.

Actuation of the synthetic jet results in substantial changes in the interaction domain between the actuator and the flow over the pressure surface and in a reduction in the scale and strength of concentration of trapped vorticity. The streamwise extent of the domain in which the pressure decreases is reduced (the downstream edge of this domain moves to x/c≈0.26), and there is a sharp increase in the magnitude of the maximum pressure decrement. While the extent of the streamwise domain seems to be independent of $Re_c$, the magnitude of the pressure peak decreases somewhat with increasing $Re_c$ ($C_p$=−1.4, −1.3, and −1.1). However, it should be noted that in these measurements the actuation amplitude is invariant (to avoid damage to the actuator) and therefore the effective momentum coefficient of the jet decreases with increasing $Re_c$ (for the data in FIGS. 3a-c, $C_\mu=2.05\times10^{-3}$, $0.91\times10^{-3}$ and $0.51\times10^{-3}$, respectively). As discussed in connection with FIG. 7 below, the effectiveness of the actuation increases with $Re_c$ and that at α=4° and $Re_c=6.7\times10^5$, $L/D_p$ in the presence of actuation is 2.2 times higher than for the baseline airfoil (96 vs. 43).

Figure 4:
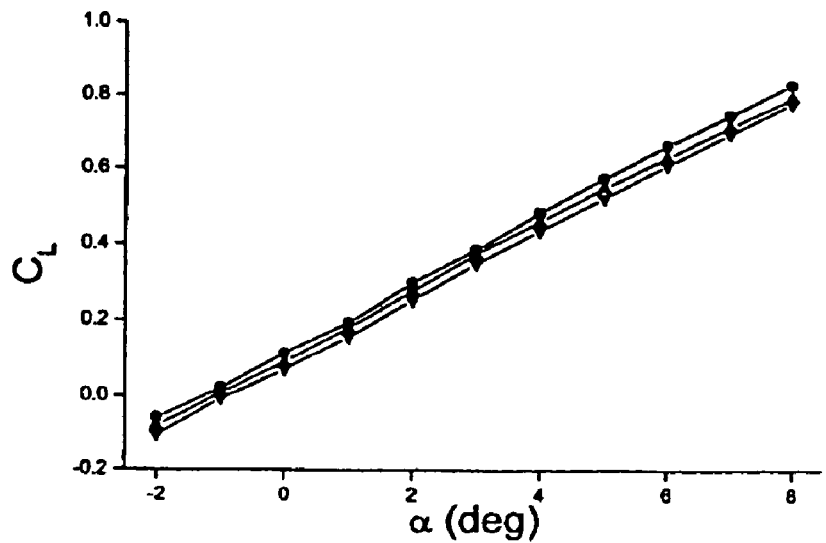
FIG. 4 is a graph depicting variation of $C_L$ with angle of attack, wherein (●) denotes baseline, (▲) denotes actuator not operating, and (▼) denotes actuator operating.

The effects of the actuation on the aerodynamic characteristics of the airfoil for angles of attack within the range −2°<α<8° are discussed next. It should be understood, however, that potential applications of the present embodiment are not limited to angles of attack within this range. The variation of the lift coefficient (FIG. 4) shows that the decrease in pressure on the bottom surface of the airfoil as a result of the presence of the inactive hybrid actuator (cf. FIGS. 3a-c) leads to a slight reduction in lift relative to the baseline airfoil which is invariant with angle of attack within the range mentioned above. The reduction is nominally $\Delta C_L \approx 0.02$ or approximately 4% at α=4°. Jet actuation results in additional reduction in lift of 0.02 or $\Delta C_L \approx 0.04$ relative to the smooth airfoil (approximately 8% at α=4°). However, as shown in FIG. 4, the presence of the inactive hybrid actuator results in virtually no change in drag for 1°<α<5°, a slight increase for α<1° and a comparable slight decrease for α>5°. When actuation is applied ($C_\mu=2.05\times10^{-3}$), the pressure drag decreases substantially and uniformly (relative to the baseline) over the entire range of α (at α=4°, $\Delta C_D \approx 0.075$). Of particular note are the (small) negative values of $C_{Dp}$ for −2°<α<3° indicating that the reduction in pressure drag can further offset the friction drag assuming that it is unaffected by the presence of the hybrid actuator. The drag polar for this configuration (FIG. 6) demonstrates that while the curves for the baseline (smooth) airfoil and the airfoil with the inactive hybrid actuators are almost identical, the activation of the jet leads to a shift of the entire curve to the left such that for lowest $C_{Dp}$ attained in the absence of actuation ($C_{DP}$=0.025) the lift in the presence of actuation increases from $C_L$=0.08 to 0.39. As will be described later, the friction drag is estimated from boundary layer measurements and it is shown that actuation reduces the total drag from $C_D$=0.017 for the baseline airfoil to $C_D$=0.012.

The lift to pressure drag ratio for this airfoil is shown in FIG. 6. As expected, within the range 3°<α<8° $L/D_p$ in the presence of the inactive hybrid actuator is virtually identical to $L/D_p$ for the smooth airfoil while for α<3° the inactive actuator leads to some degradation in performance. However, jet actuation ($C_\mu=2.05\times10^{-3}$) results in a large increase in $L/D_p$ compared to the baseline. The increase at α=4° is from 42.9 to 96.3 (i.e., over 120%). At lower angles of attack $C_{Dp}$ becomes small and therefore $L/D_p$ is very large. Nevertheless, since the total drag at α=4° and $Re_c=6.7\times10^5$ is known, it is noted that L/D increases from 28.3 for the baseline airfoil to 35.8 for the actuated airfoil, an increase of 27%.

Figure 8:
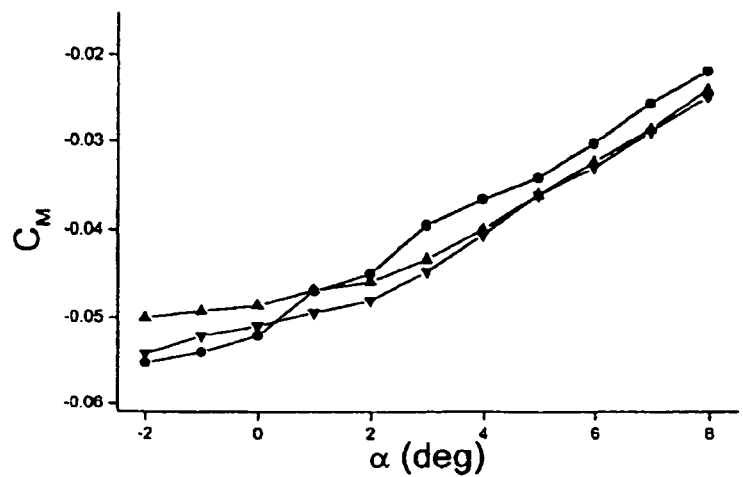
FIG. 8 is a graph depicting variation of $C_M$ with angle of attack, wherein (●) denotes baseline, (▲) denotes actuator not operating, and (▼) denotes actuator operating.

Finally, the effect of the actuation on the moment coefficient (about c/4) is shown in FIG. 8 for 1°<α<8°. These data show that because of the proximity to c/4, the effect of the hybrid actuator in the absence and presence of the jet is rather small. For α>3° the hybrid actuator results in a slight decrease in $C_M$ (≈0.003) where the jet has virtually no effect. For α<3° $C_M$ for the baseline drops slightly below the moment coefficient of the airfoil with the inactive hybrid actuator but jet actuation leads to a nominal reduction of 0.003 which brings $C_M$ close to the baseline values.

Figure 9:
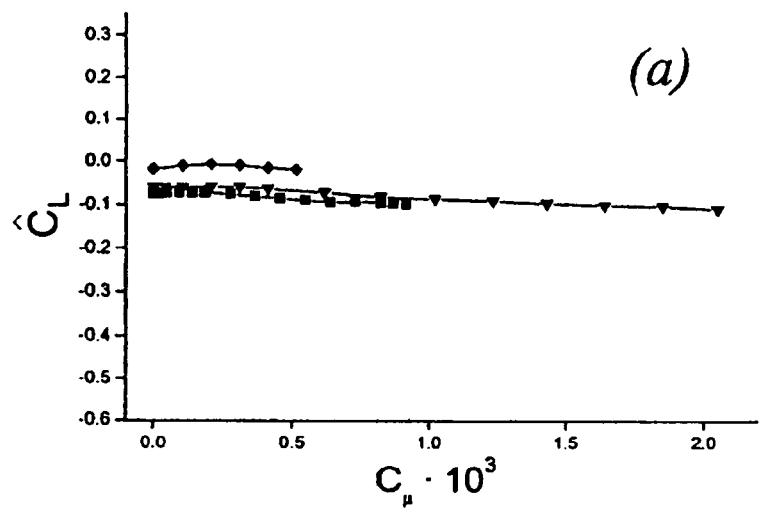
FIG. 9 includes graphs depicting variation with $C_\mu$ of (a) $\hat{C}_L$ and (b) $\hat{C}_{Dp}$ for $Re_c=$(▼) $6.7\times10^5$, (■) $1.0\times10^6$, (♦)$1.3\times10^6$.
Figure 9:
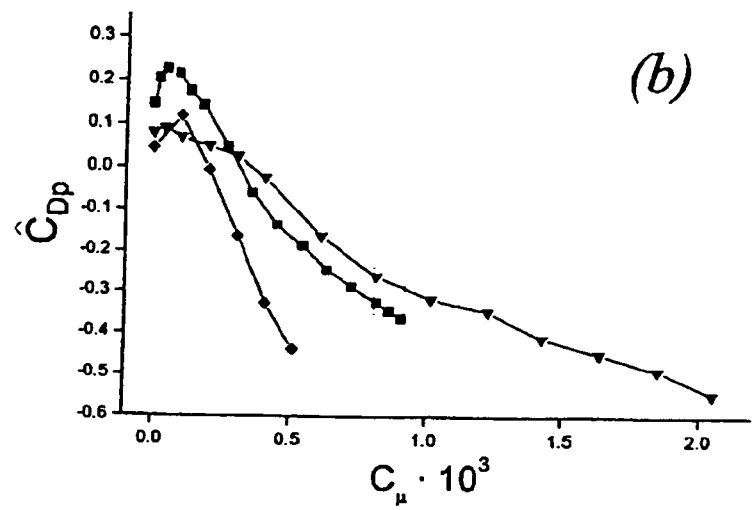
Figure 10:
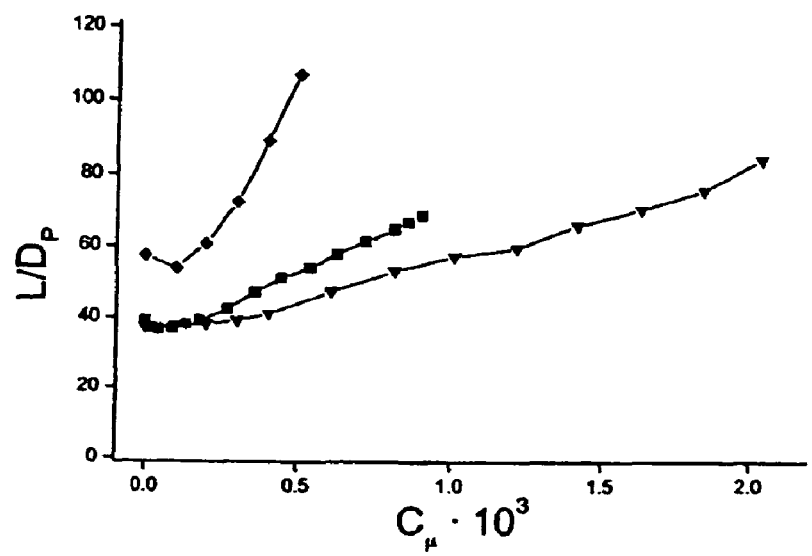
FIG. 10 is a graph depicting variation of $L/D_p$ with $C_\mu$ for $Re_c=$(▼) $6.7\times10^5$, (■) $1.0\times10^6$, (♦)$1.3\times10^6$.

The sensitivity of aerodynamic performance modification to the actuation amplitude as measured by the jet's momentum coefficient is shown in FIGS. 9 and 10 for α=4° and $Re_c=6.7\times10^5$, $1.0\times10^6$, and $1.3\times10^6$. FIGS. 9a and b show the variation of the fractional lift and drag increments (relative to the baseline airfoil) $\hat{C}_{Dp}=C_{Dp\ smooth}$ and $\hat{C}_L=\Delta C_L/C_{L\ smooth}$. The maximum value of $C_\mu$ is limited by the performance of the present actuator. As discussed above, FIG. 8a shows that while the presence of the inactive hybrid actuator results in some reduction in lift, the activation of the jet brings about only a minimal additional change. Overall, the decrease in lift induced by the presence of the hybrid actuator is less than 10% for $Re_c=6.7\times10^5$ and $1.0\times10^6$, and less than 2% for $Re_c=1.3\times10^6$. The corresponding fractional variations in $C_D$ are far more significant. The maximum available $C_\mu$ at each of the three Reynolds numbers (in increasing order) results in maximum reductions in pressure drag of 55%, 40%, and 45%, respectively, relative to the baseline configuration. It is interesting to note that at low $C_\mu$ (nominally below $0.4\times10^{-3}$), the jet actuation results in an increase in pressure drag relative to the baseline and to the airfoil with the inactive hybrid actuator. It is conjectured that the weak actuation leads to an increase in the extent of the recirculating flow domain downstream of the actuator. Of particular note is the performance at $Re_c=1.3\times10^6$ for which the reduction in pressure drag is 45% despite the maximum available jet momentum coefficient of $C_\mu=0.5\times10^{-3}$. FIG. 9 shows the variation of $L/D_p$ with $C_\mu$. The most prominent feature of these data is that for a given $C_\mu$ (e.g., $0.5\times10^{-3}$), $L/D_p$ increases with Reynolds number. It is also noteworthy that the $L/D_p$ increases significantly relative to the baseline airfoil when the actuation is active; for $Re_c=1.0\times10^6$ and $1.3\times10^6$, the $L/D_p$ at maximum $C_\mu$ increases by 41% and 75%, respectively.

D. Measurements in the Airfoil Boundary Layer

In the experimental results discussed above, the evolution of the boundary layer along the airfoil can be characterized using high-resolution PIV measurements at a number of stations along its top and bottom surfaces. In addition to detailed velocity distributions and integral measures, it is also desired to estimate of the friction drag and hence the total drag from measurement of the (scaled) wall shear stress around the airfoil. The velocity distribution within the boundary layer is measured in cross stream planes that are normal to the spanwise axis of the airfoil at ten streamwise locations on the pressure surface and eight streamwise locations on the suction surface. The fields of view are nominally square and measure between 13 mm and 20 mm on the side. The measurements are obtained at α=4° and $Re_c=6.7\times10^5$. Each data set consists of 400 image pairs. The time-averaged data are used to calculate the displacement thickness, momentum thickness, shape factor, and wall friction coefficient $C_f$.

Figure 11:
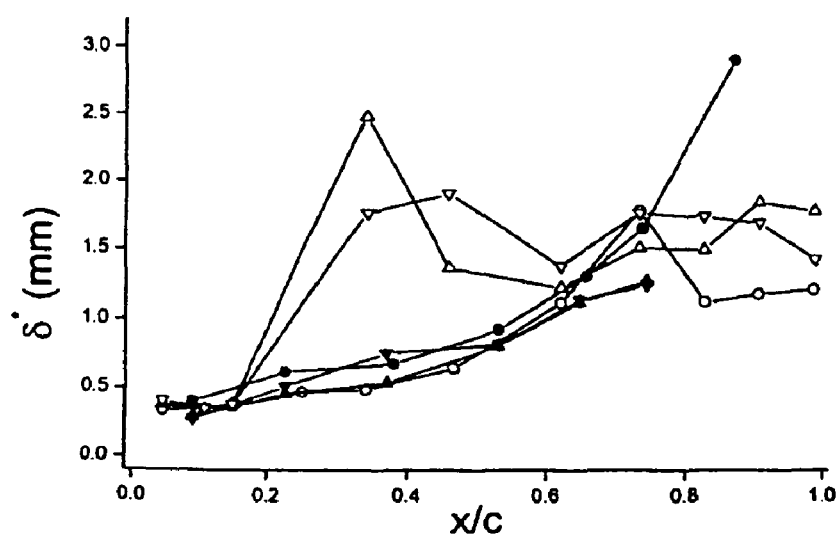
FIG. 11 is a graph depicting variation of $\delta^*$ with streamwise location for $Re_c=6.7\times10^5$ and a $\alpha=4°$, wherein (●) denotes baseline, (▲) denotes actuator not operating, and (▼) denotes actuator operating, and wherein open symbols indicate pressure surface and closed symbols indicate suction surface.

The variation of the boundary layer displacement thickness δ* along the surface of the airfoil is shown in FIG. 11 for the baseline airfoil, and the airfoil with the inactive and actuated hybrid actuator. On the suction surface (closed symbols), the displacement thickness increases monotonically for the three configurations, and is typically slightly (0.1 mm) larger for the baseline airfoil. The presence of the hybrid actuator on the pressure surface of the airfoil leads to a significant increase in δ* downstream of x/c=0.15 (where δ*≈0.37 mm). The increase in δ* at the next measurement station (0.13 c downstream of the jet actuator orifice) is the result of the formation of the recirculation domain that is associated with the trapped vortex. The effects of this domain are present as far downstream as x/c=0.6. When the actuator is operating, the extent of the recirculating domain is decreased and the magnitude of the displacement thickness is reduced as higher speed fluid is drawn closer to the wall (cf FIG. 16b). Farther downstream, δ* remains relatively unchanged at approximately 1.5 mm. The corresponding displacement thickness of the boundary layer of the baseline airfoil increases monotonically up to 0.74 c before decreasing to ≈1.2 mm after full transition to turbulence.

Figure 12:
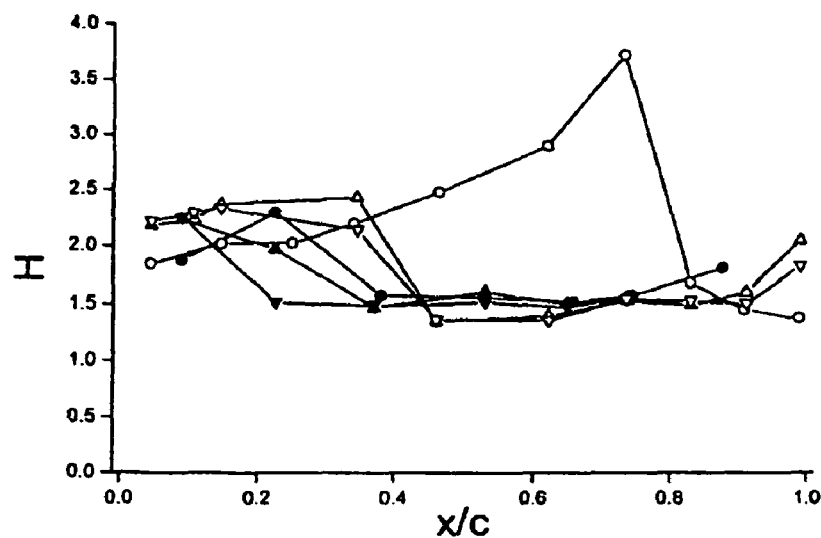
FIG. 12 is a graph depicting variation of boundary layer shape factor with streamwise location, wherein (●) denotes baseline, (▲) denotes actuator not operating, and (▼) denotes actuator operating, and wherein open symbols indicate pressure surface and closed symbols indicate suction surface.

The state of the airfoil's boundary layer can be assessed from the streamwise variation of its shape factor H (FIG. 12). The values upstream of 0.1 5 c on both the top and bottom surfaces are between 1.8 and 2.4, typical of a laminar boundary layer (recall that H is also affected by surface curvature and effects of pressure gradient). There is significant variation in the shape factor on the suction surface near 0.2 c, where the boundary layer appears to undergo transition to turbulence in the presence of the hybrid actuator. Downstream of 0.35 c, a nominal value of 1.5 is measured on the top surface for all three configurations and for both states (i.e., inactive and active) of the hybrid actuator, indicating that the boundary layer downstream of the actuator is turbulent. The shape factor for the pressure surface boundary layer of the baseline airfoil increases monotonically to a level in excess of 3.5 before decreasing to approximately 1.5 near 0.8 c indicating transition to turbulence. Therefore, it is expected that the friction drag of the smooth airfoil is in fact somewhat lower than in the presence of the hybrid actuator.

Figure 13:
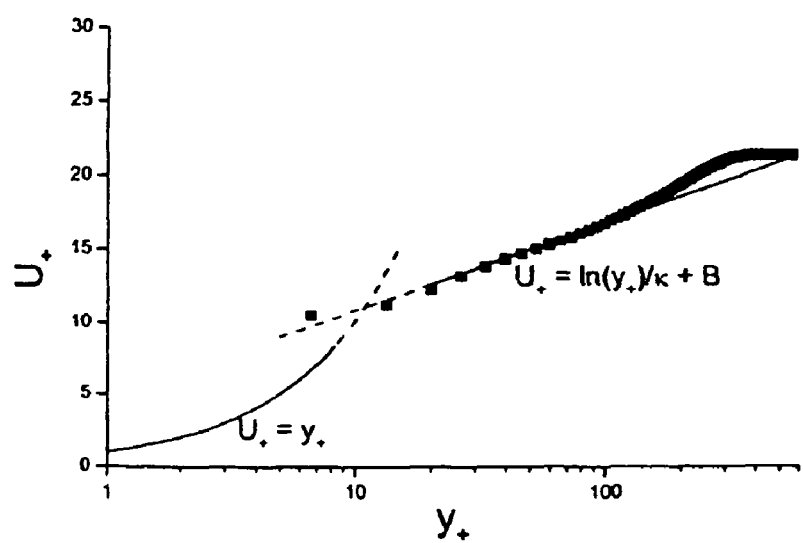
FIG. 13 is a graph depicting cross-stream velocity distribution for a turbulent boundary layer scaled to fit the universal law of the wall.

The wall friction coefficient $C_f$ is computed from the measured velocity distributions. At locations where the boundary layer is turbulent, $C_f$ is determined using the method proposed by Clauser (see, Clauser, F. H. (1954). "Turbulent Boundary Layers in Adverse Pressure Gradients," *Journal of the Aeronautical Sciences*, February 1954, 91-108), as illustrated in FIG. 13, which shows an example of a cross stream distribution of the streamwise velocity (measured at x/c=0.38 on the suction surface of the airfoil). The measured velocity profiles are scaled to fit the universal law of the wall for a turbulent boundary layer using the wall velocity scale $u^*=[v(\partial u/\partial y)_w]^{1/2}$ and the length scale $yu^*/v$. The wall friction coefficient is obtained from $C_f=2(u/U_\infty)^2$. Values of $C_f$ using the local external velocity to the boundary layer $U_e$ are also computed. At locations where the boundary layer is laminar, the velocity distributions are fitted to a Falkner-Skan profile, from which the wall friction coefficient is obtained.

Figure 14:
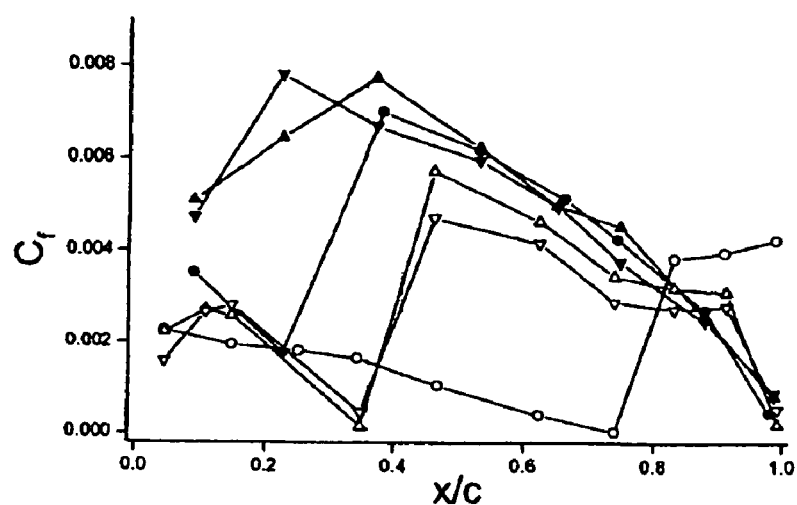
FIG. 14 is a graph depicting variation of wall friction coefficient with streamwise location, wherein (●) denotes baseline, (▲) denotes actuator not operating, and (▼) denotes actuator operating, and wherein open symbols indicate pressure surface and closed symbols indicate suction surface.

The streamwise distribution of the wall friction coefficient $C_f$ (normalized by the global free stream velocity) is shown in FIG. 14. On the suction surface (closed symbols), at x/c=0.09 the boundary layer is laminar with $C_f \approx 0.004$. At the next downstream station (x/c=0.23), $C_f$ of the baseline airfoil decreases because the laminar boundary layer continues to develop but then increases (at x/c=0.38) upon transition to turbulence. As noted in connection with the evolution of the shape factor (FIG. 12) transition on the top surface in the presence of the hybrid actuator occurs farther upstream, resulting in larger values of $C_f$ at x/c=0.23. For x/c>0.35, $C_f$ monotonically decreases as a turbulent boundary layer develops, for all three configurations. On the pressure surface (open symbols), the boundary is laminar near the leading edge for all three configurations, with $C_f \approx 0.002$. As noted in connection with FIG. 12, the boundary layer of the baseline airfoil remains laminar as far as 0.74 c and $C_f$ decreases monotonically with x/c followed by transition and an increase in $C_f$ to ≈0.004. In the presence of the hybrid actuator, $C_f$ decreases significantly downstream of the actuator near the downstream edge of the recirculating flow domain (x/c=0.35 c). When the jet is activated, the streamwise extent of the recirculating domain decreases and therefore the skin friction coefficient downstream of x/c>0.4 is somewhat lower than with the inactive actuator.

The skin friction drag $C_{Df}$ is estimated from integration of the wall friction coefficient around the airfoil. For the baseline configuration, where the boundary layer is laminar along much of the pressure surface, $C_{Df}=0.0058$. In the presence of the hybrid actuator $C_{Df}=0.0081$ when the actuator is inactive and 0.0076 when the jet is activated. Combining the friction drag with the pressure drag yields the total drag coefficient for the airfoil for the three configurations tested here $C_D=0.0170$ (baseline), 0.0192 (inactive hybrid actuator) and 0.0121 (jet actuation). These results show that for $Re_c=6.7\times10^5$, the actuation leads to a reduction of 29% in the total drag relative to the baseline airfoil and therefore to a 27% increase in L/D from 28.3 to 35.8.

Figure 15:
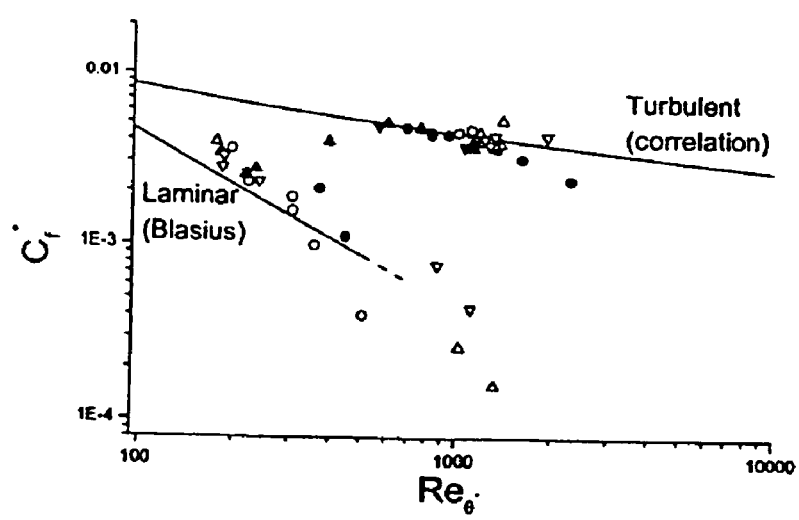
FIG. 15 is a graph depicting variation of $C_f^*$ with Reynolds number based on the boundary layer momentum thickness, wherein (●) denotes baseline, (▲) denotes actuator not operating, and (▼) denotes actuator operating, and wherein open symbols indicate pressure surface and closed symbols indicate suction surface.

It is instructive to compare the dependence of the $C_f^*$, the wall friction coefficient (normalized by the velocity external to the boundary layer) on $Re_{\theta*}$, (Reynolds number based on the momentum thickness of the boundary layer), as shown in FIG. 15. Also shown are the wall friction coefficient for a Blasius boundary layer, and a correlation for the wall friction of a flat plate turbulent boundary layer (Abbott and von Doenhoff[19]): $C_f^*=0.306 \ln(4.075 i Re_\theta)^{-2}$. As shown in FIG. 15, the values of $C_f^*$ for the turbulent boundary layers on the surface of the airfoil agree well with the correlation, except in the locations where the flow is not fully attached (i.e., downstream of the actuator and near the trailing edge). When the boundary layer is laminar, the data seems to have the same slope as for the Blasius boundary layer (n=−1), but $C_f^*$ is slightly higher ostensibly as a result of the surface curvature and the favorable pressure gradient (corresponding to Falkner-Skan boundary layers where β>0).

Figure 16:
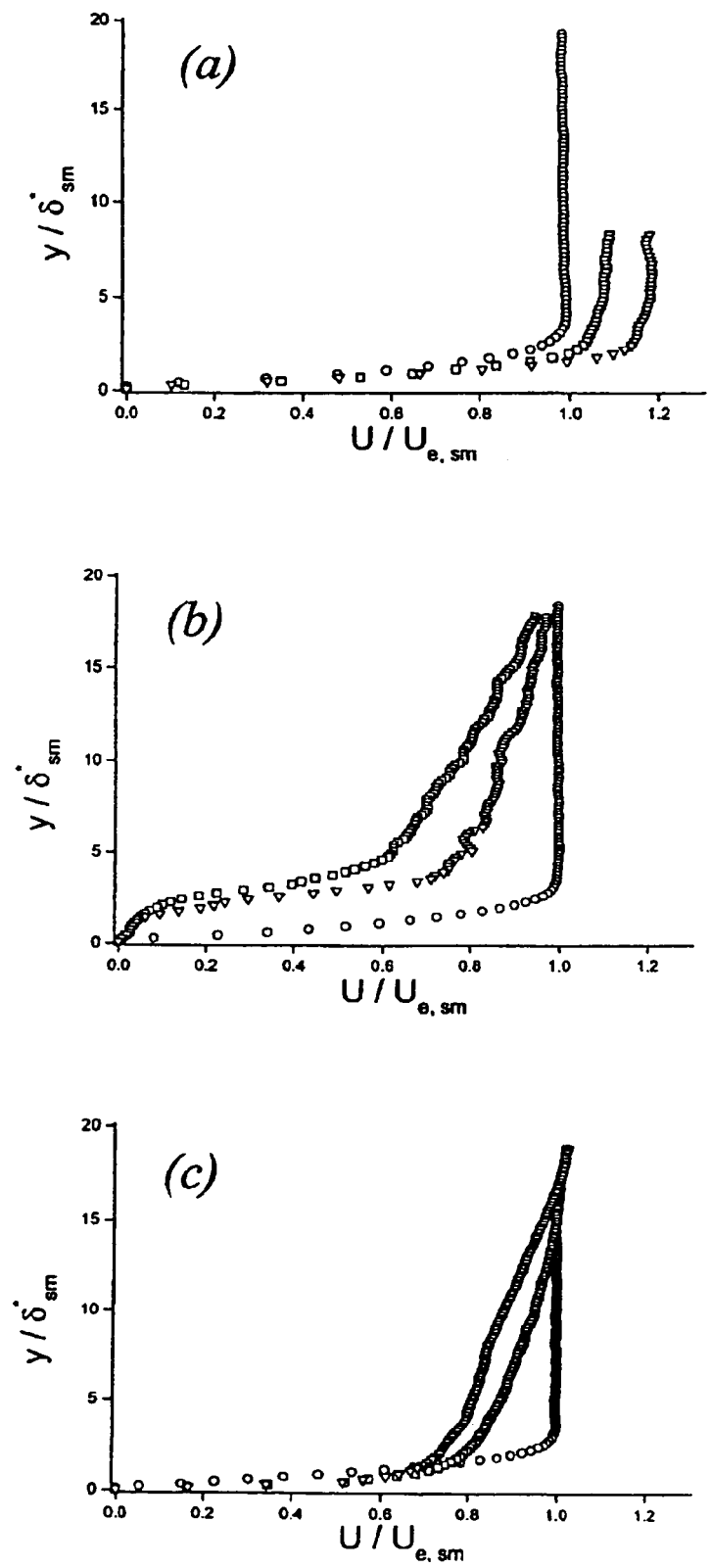
FIG. 16 includes graphs depicting cross-stream velocity profiles at x/c=(a) 0.15, (b) 0.35, (c) 0.46, wherein (○) denotes baseline, (□) denotes jet inactive, and (∇) denotes jet active.

Finally, FIGS. 16a, b, and c show sample cross stream velocity distributions in the pressure surface boundary layer at x/c=0.15, 0.35, and 0.46, respectively. The velocity and cross stream coordinate are scaled by the local external velocity ($U_{e\,sm}$) and displacement thickness ($\delta_{sm}$) of the boundary layer of the baseline airfoil. Note that the velocity between the last valid data point and the wall is estimated using linear interpolation. Although the velocity distributions upstream of the actuator orifice (FIG. 16a) indicate that the boundary layer of each of the three configurations is indeed laminar, the local external velocity varies significantly and is lowest for the baseline airfoil. The inactive hybrid actuator results in a significant increase of the local external velocity to 1.08 $U_{e\,sm}$ that is associated with the local reduction in pressure (of FIGS. 3a-c). The actuation of the jet results in an additional increase in the external velocity to 1.18 $U_{e\,sm}$ that is apparently commensurate with the large suction peak downstream of the jet (FIG. 3c). Therefore the formation of the trapped vortex domain downstream of the actuator leads to a local acceleration of the external flow and a reduction in the local static pressure that, owing to the slope of the surface, contributes to a significant reduction in the pressure drag (with minimal fractional reduction in lift). It is noteworthy that when the actuator is inactive the extent of the recirculating flow domain is such that the low pressure domain downstream of the actuator nullifies the effect of the reduced pressure upstream. The role of the cross flow in the formation of the trapped vortex and the domain of reduced pressure is evident from similar pressure measurements that were taken in the absence of the cross flow. These measurements have shown that the local change in surface pressure when the jet is actuated at the present momentum coefficient ($C_\mu=2.05\times 10^{-3}$) is virtually immeasurable.

The velocity distributions in FIG. 16b are measured 0.13 c downstream of the actuator (the distribution for the baseline airfoil at the same streamwise location is also shown for reference). At this location, the external velocity in the presence of the hybrid actuator (inactive and active) is somewhat lower than the corresponding speed over the baseline airfoil commensurate with the increase in the local static pressure downstream of the actuator compared to the baseline (cf. FIG. 3a-c). Evidently, the reduction in velocity induced by the inactive actuator is considerably larger than when the actuator is active (which reduces the extent of the trapped vortex). For this reason the pressure downstream of the actuator increases when the jet is activated, resulting in a decrease in pressure drag. Further evidence for the pressure recovery is shown in FIG. 16c, where the external velocity downstream of the actuator is almost identical to that of the baseline flow.

E. Another Representative Embodiment

Figure 17:
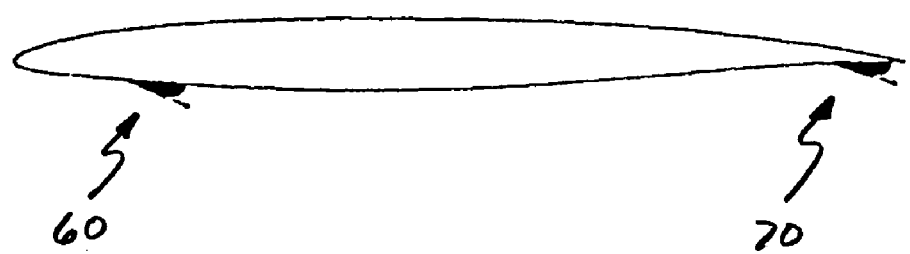
FIG. 17 is a schematic side view of a representative airfoil model, with two synthetic jet actuators denoted by arrows.

In a second representative embodiment, an additional hybrid actuator 70 is installed on an airfoil downstream from a first hybrid actuator 60 discussed above. Preferably, though not required, the second hybrid actuator 70 is positioned near a trailing edge of the airfoil, as illustrated in FIG. 17. In an experimental setup of the second representative embodiment, experiments were conducted in order to characterize the effects of the actuation on the pressure distribution around the airfoil and the aerodynamic coefficients. The upstream actuator 60 in this configuration is installed on the pressure surface at 0.18 c, and operates at resonance at a frequency of $f_{act}=2220$ Hz with $C_\mu=0.6\times 10^{-3}$. The downstream actuator 70, located at 0.94 c, also operates at resonance, at a frequency of $f_{act}=1770$ Hz, with $C_\mu=0.9\times 10^{-3}$. These locations of the actuators 60, 70, of course, are not limiting or required. It may be desirable in certain applications, or with certain airfoils to install the two or more actuators 60, 70 at different locations.

Figure 18:
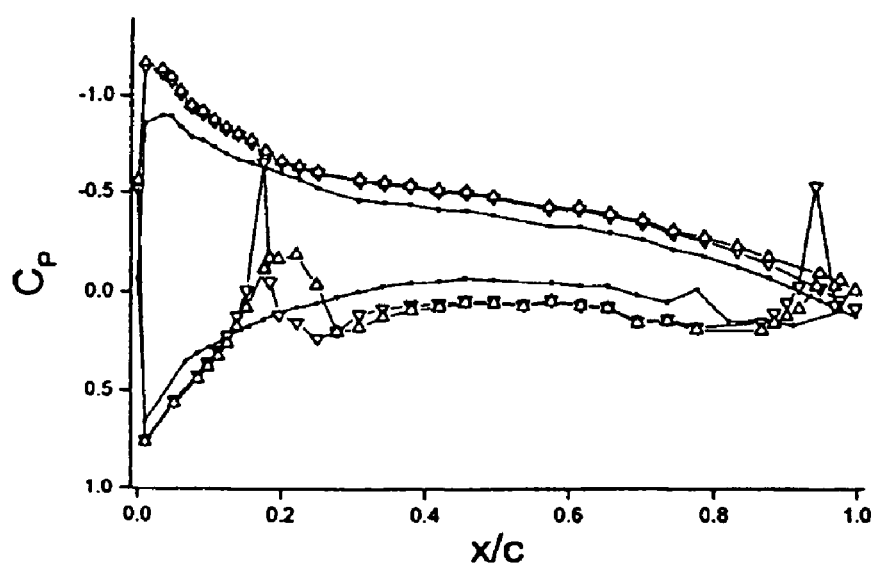
FIG. 18 is a graph depicting pressure distribution around an airfoil for $\alpha=4°$ for $Re_c=1.0\times10^6$, wherein (—) denotes baseline, ($\Delta$) denotes actuator not operating, and ($\nabla$) denotes actuator operating.

The measured experimental effects of the actuators on the pressure distribution for $\alpha=4°$ and $Re_c=1.0\times 10^6$ are shown in FIG. 18, where the smooth airfoil pressure distribution is compared to the pressure distributions of the airfoil with both actuators operating and with both actuators installed but not operating. For the unforced airfoil, the pressure distribution in the vicinity of the upstream actuator is similar to that of the airfoil with only one actuator installed (cf. FIG. 3). However, the presence of the downstream actuator results in a decrease in the trailing edge pressure, leading to a reduction in pressure across the entire suction surface as well as an increased pressure on the pressure surface between the actuators. These changes correspond to increased circulation and hence significantly greater lift relative to the smooth airfoil. It is also noteworthy that the ramp upstream of the actuator (between 0.85 c and the actuator orifice) causes the flow to accelerate, resulting in decreasing pressure. When the actuators are operating, the pressure distribution near the upstream actuator is comparable to that of the airfoil with only the upstream actuator installed and operating (cf. FIG. 3). Operation of the downstream actuator results in a suction peak near the actuator orifice (with $C_p=-0.5$) and further reductions in pressure along the actuator ramp that lead to a reduction in drag because of the slope of the ramp surface. There is also an increase in pressure downstream of the actuator at the trailing edge, accompanied by increased pressure near the trailing edge on the suction surface as far upstream as 0.75 c.

Figure 19:
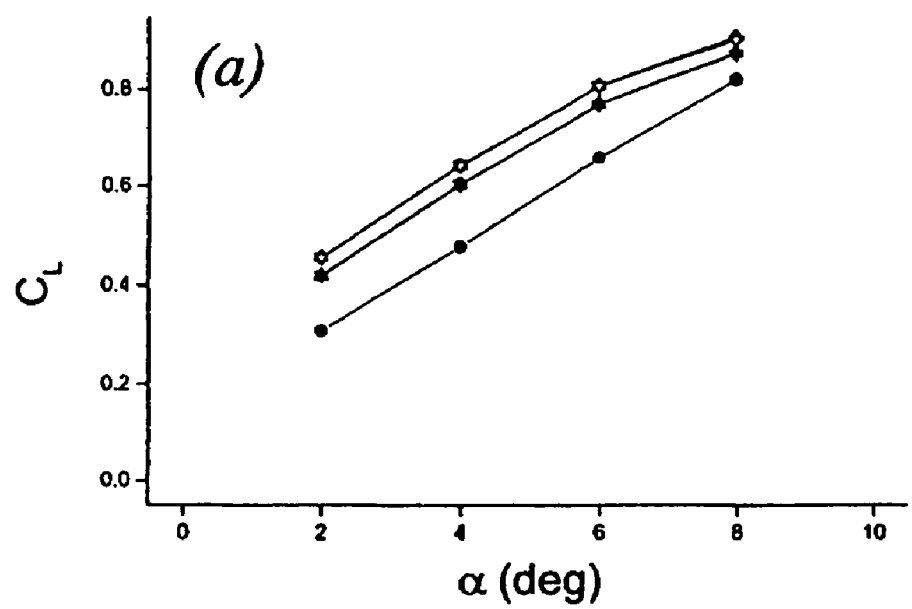
FIG. 19 includes graphs depicting variation of (a) $C_L$ and (b) $C_{Dp}$ with angle of attack, wherein (●) denotes baseline, ($\Delta$) denotes both actuators not operating, (▲) denotes downstream actuator alone operating, and (▼) denotes both actuators operating.
Figure 19:
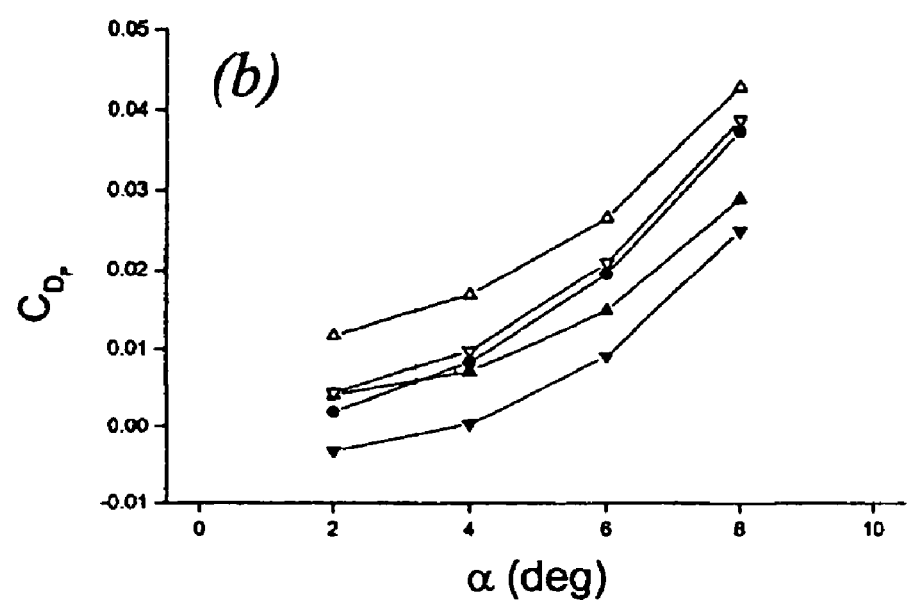

The effects of the actuation on the lift and pressure drag coefficients at various angles of attack are shown in FIG. 19. The presence of the actuators leads to an increase in circulation (cf. FIG. 18), and a corresponding increase in lift, as shown in FIG. 19a, with a nearly constant increment of $\Delta C_L \approx 0.13$ compared to the smooth airfoil across the entire range of $\alpha$. When the downstream actuator is operated, the lift increase is reduced to $\Delta C_L \approx 0.09$ relative to the smooth airfoil regardless of whether the upstream actuator is operating. Operation of the upstream actuator has little significant effect on the lift coefficient.

Variation of the drag coefficient with $\alpha$ is shown in FIG. 19b for the smooth airfoil and the various operating conditions with both actuators installed. The drag is greatest when the actuators are installed but not operating, and is reduced to a level 0.002 greater than the smooth airfoil when the upstream actuator alone is operating. When the downstream actuator alone is in operation, the drag is reduced for $\alpha>4°$ with the magnitude of the drag reduction increasing with $\alpha$. The drag reduction is greatest when both actuators are operated, and the magnitude of the drag reduction relative to the smooth airfoil varies from $\Delta C_{Dp} \approx 0.005$ at $\alpha=2°$ to $\Delta C_{dp} \approx 0.012$ at $\alpha=8°$.

As described above, global modifications of the aerodynamic characteristics of a commercial transport swept airfoil at cruise (low) angles of attack (when the baseline flow is fully attached) are achieved without moving control surfaces using hybrid actuators that are surface mounted on the pressure side of the airfoil 0.21 c downstream of its leading edge. Control is effected by the manipulation of trapped vorticity concentrations that are induced by leveraging the presence of a miniature, O(0.01 c) obstruction integrated with a synthetic jet actuator. At $Re_c=1.3\times 10^6$, the operation of the hybrid actuators with maximum $C_\mu=0.5\times 10^{-3}$ results in continuous variation of the pressure drag from 15% greater to 50% less than the pressure drag of the baseline airfoil with minimal lift penalty and consequently an increase of the lift to pressure drag ratio in excess of a factor of two. High-resolution particle image velocimetry measurements at $Re_c=6.7\times 10^5$ were used to characterize the evolution of the boundary layer on the surface of the airfoil and estimate the total drag coefficient. It is shown that the overall drag is reduced by 29% and yields an increase in L/D of 27%.

Various other teachings may be relevant to the foregoing discussion and include: U.S. Pat. No. 6,644,598, to Glezer, et al., entitled Modification of Fluid Flow about Bodies and Surfaces through Virtual Aero-Shaping of Airfoils with Synthetic Jet Actuators; U.S. Pat. No. 5,988,522, to Glezer, et al., entitled Synthetic Jet Actuators for Modifying the Direction of Fluid Flows; U.S. Pat. No. 5,957,413, to Glezer, et al., entitled Modifications of Fluid Flow about Bodies and Surfaces with Synthetic Jet Actuators; and, U.S. Pat. No. 5,758,823, to Glezer, et al., entitled Synthetic Jet Actuators and Applications Thereof—all of which are incorporated herein by reference.

The foregoing description has been presented for purposes of illustration and description. It is not intended to be exhaustive or to limit the invention to the precise forms disclosed. Modifications or variations are possible in light of the above teachings. By way of example, the hybrid actuators do not need to span any certain length of a solid body, such as wing/lifting surface. Additionally or alternatively, multiple hybrid actuators can be used, such as at the same chord location.

Notably, the actuators typically do not exert enough influence on aerodynamic characteristics of the solid bodies with which they are associated to cause flight instability issues. Thus, failure of such an actuator or an associated system for extending and/or retracting such an actuator should not be significantly problematic.

It should also be noted that a pitching moment can be developed by an actuator located toward the aft of an airfoil, for example, as the moment arm between such an actuator and the center of gravity approaches a maximum. Thus, operation of such an actuator could be used to trim, or at least augment trim, of an aircraft control surface, e.g., ailerons.

The invention claimed is:

1. A system for modifying a fluid flowing over a solid body, comprising:
    (a) a vorticity concentration-producing component disposed on a pressure side of the solid body, wherein the fluid flowing over the solid body separates from a surface of the solid body due to the vorticity concentration-producing component; and
    (b) a synthetic jet actuator positioned such that the fluid flowing over the solid body encounters the vorticity concentration-producing component before encountering the synthetic jet actuator, the synthetic jet actuator having a jet housing, the jet housing having an internal chamber with a volume of fluid and an opening in the jet housing connecting the internal chamber to an external environment having the fluid, the synthetic jet actuator being operative to periodically change the volume within the internal chamber such that a synthetic jet stream comprising a series of fluid vortices is generated and projected in the external environment out from the opening of the jet housing resulting in a reduction in pressure drag of the solid body compared to the pressure drag exhibited by the solid body without operation of the synthetic jet actuator;
    wherein the vorticity concentration-producing component extends outwardly from the surface of the solid body and into the fluid flow;
    wherein the opening of the jet housing is mounted on the vorticity concentration-producing component and is spaced from the surface of the solid body such that at least a portion of a vorticity concentration produced by the vorticity concentration-producing component is trapped between the opening of the jet housing and the surface of the solid body; and
    wherein the synthetic jet stream emanates in a direction approximately parallel to the direction of the fluid flowing over the solid body when the fluid is attached to the surface of the solid body.

2. The system of claim 1, wherein the opening of the jet housing is disposed aft of the leading edge at a distance between ten percent and thirty percent of said defined length.

3. The system of claim 1, wherein the solid body has a leading edge, a trailing edge, and a defined length therebetween, and the vorticity concentration-producing component is a protrusion extending outwardly into the fluid flow.

4. The system of claim 3, wherein the protrusion has a height equal to between one-half percent to three percent of the defined length.

5. The system of claim 3, wherein the protrusion comprises a ramp, the ramp having a forward-facing surface inclined with respect to the solid body and an aft-facing surface, the opening of the jet housing being mounted on the aft facing surface.

6. The system of claim 1, wherein said solid body is an aerodynamic surface.

7. The system of claim 1, wherein said solid body is a wing.

8. The system of claim 1, wherein the vorticity concentration-producing component is a first vorticity concentration-producing component and the synthetic jet actuator is a first synthetic jet actuator; and the system further comprises:
    (c) a second vorticity concentration-producing component disposed on the pressure side of the solid body; and
    (d) a second synthetic jet actuator positioned such that the fluid flowing over the solid body encounters the first vorticity concentration-producing component and the second vorticity concentration-producing component before encountering the second synthetic jet actuator, the second synthetic jet actuator being operative to emanate a second synthetic jet stream comprising a second series of fluid vortices.

9. The system of claim 8, wherein the synthetic jet streams emanated by the first and second synthetic jet actuators are oriented in directions corresponding to the direction of the fluid flowing over the solid body.

10. The system of claim 8, wherein the solid body has a leading edge, a trailing edge, and a defined length therebetween, and each of the first vorticity concentration-producing component and the second vorticity concentration-producing component has a height equal to between one-half percent to three percent of the defined length.

11. The system of claim 8, wherein:
    the second synthetic jet actuator has a second jet housing, the second jet housing having a second internal chamber with a volume of fluid and a second opening in the second jet housing connecting the second internal chamber to the external environment; and
    the second opening of the second jet housing is disposed aft of the leading edge at a distance between eighty percent and one-hundred percent of said defined length.

12. The system of claim 11, wherein the second synthetic jet actuator comprises means for periodically changing the volume within the internal chamber so that the series of fluid vortices is emanated from the second opening as the second synthetic jet stream.

13. The system of claim 8, wherein the second vorticity concentration-producing component comprises a ramp, the ramp having a second forward-facing surface inclined with respect to the solid body and an aft-facing surface, the opening of the jet housing being mounted on the aft facing surface.

14. The system of claim 8, wherein the first and second synthetic jet actuators are operative to emanate respective synthetic jet streams such that overall drag of the solid body is reduced compared to the overall drag exhibited by the solid body without operation of the first and second synthetic jet actuators.

15. The system of claim 14, wherein the first and second synthetic jet actuators are operative to emanate respective synthetic jet streams such that lift/drag of the solid body is increased compared to the lift/drag exhibited by the solid body without operation of the first and second synthetic jet actuators.

16. The system of claim 8, wherein the first and second synthetic jet actuators are operative to emanate respective synthetic jet streams such that lift/drag of the solid body is increased compared to the lift/drag exhibited by the solid body without operation of the first and second synthetic jet actuators.

17. The system of claim 8, wherein the solid body is an aerodynamic surface.

18. The system of claim 8, wherein the solid body is a wing.

19. A system for modifying a fluid flowing over a solid body, comprising:
- (a) a first vorticity concentration-producing component disposed on a pressure side of the solid body;
- (b) a first synthetic jet actuator having a first opening positioned on the pressure side of the solid body, the first opening being spaced from the solid body such that a first vorticity concentration produced by the first vorticity concentration-producing component is trapped between the first opening and the solid body;
- (c) a second vorticity concentration-producing component disposed on the pressure side of the solid body, the second vorticity concentration-producing component being positioned downstream of the first synthetic jet actuator; and
- (d) a second synthetic jet actuator having a second opening positioned on the pressure side of the solid body, the second opening being spaced from the solid body such that a second vorticity concentration produced by the second vorticity concentration-producing component is trapped between the second opening and the solid body;

respective openings of the first and second synthetic jet actuators being operative to emanate respective synthetic jet streams in directions corresponding to a direction of the fluid flowing over the solid body such that pressure drag of the solid body is reduced compared to the pressure drag exhibited by the solid body without operation of the synthetic jet actuators.

20. The system of claim 19, wherein the first and second synthetic jet actuators are operative to emanate respective synthetic jet streams such that overall drag of the solid body is reduced compared to the overall drag exhibited by the solid body without operation of the first and second synthetic jet actuators.

21. The system of claim 19, wherein the first and second synthetic jet actuators are operative to emanate respective synthetic jet streams such that lift/drag of the solid body is increased compared to the lift/drag exhibited by the solid body without operation of the first and second synthetic jet actuators.

22. The system of claim 19, wherein a baseline flow of the fluid flowing over the solid body remains attached to a surface of the solid body.

23. The system of claim 19, wherein the first vorticity concentration-producing component causes the fluid flowing over the solid body to separate from a surface of the solid body.

24. The system of claim 19, wherein the solid body is an aerodynamic surface.

25. The system of claim 19, wherein the solid body is a wing.

26. The system of claim 3, wherein the protrusion comprises an aft-facing surface, the opening of the jet housing being mounted on the aft facing surface.

* * * * *